(12) United States Patent
Park et al.

(10) Patent No.: US 10,511,703 B2
(45) Date of Patent: Dec. 17, 2019

(54) CHARGING DEVICE, METHOD FOR CONTROLLING CHARGING DEVICE, AND MOBILE TERMINAL CONNECTED TO SAME

(71) Applicant: LG ELECTRONICS INC., Seoul (KR)

(72) Inventors: Hyunsu Park, Seoul (KR); Junyoung Park, Seoul (KR); Hanhee Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 15/753,612

(22) PCT Filed: Aug. 18, 2016

(86) PCT No.: PCT/KR2016/009106
§ 371 (c)(1),
(2) Date: Feb. 20, 2018

(87) PCT Pub. No.: WO2017/030387
PCT Pub. Date: Feb. 23, 2017

(65) Prior Publication Data
US 2019/0182374 A1   Jun. 13, 2019

(30) Foreign Application Priority Data

Aug. 18, 2015  (KR) .................. 10-2015-0116221
Aug. 17, 2016  (KR) .................. 10-2016-0104396

(51) Int. Cl.
*H04M 1/00* (2006.01)
*H04M 1/725* (2006.01)
(Continued)

(52) U.S. Cl.
CPC ........ *H04M 1/72533* (2013.01); *G06F 1/266* (2013.01); *H02J 7/0052* (2013.01);
(Continued)

(58) Field of Classification Search
CPC .............................. G06F 1/26; H02J 7/0052
(Continued)

(56) References Cited

U.S. PATENT DOCUMENTS

2005/0253554 A1  11/2005  Difazio et al.
2012/0190412 A1   7/2012  Buniatyan
(Continued)

FOREIGN PATENT DOCUMENTS

JP    2015-032976 A    2/2015
KR    2001-0092532 A   10/2001
(Continued)

OTHER PUBLICATIONS

Lai et al., "Battery Charging Specification, Revision 1.2", USB Implementers Forum, Inc., Mar. 15, 2012, XP055244021A, pp. 1-72.

*Primary Examiner* — Kiet M Doan
(74) *Attorney, Agent, or Firm* — Birch, Stewart, Kolasch & Birch, LLP

(57) ABSTRACT

The present invention provides a charging device comprising: a main body capable of being connected to a mobile terminal; a charging unit for charging the mobile terminal in a first connection mode; a backup unit for receiving data stored on the mobile terminal in a second connection mode, which is capable of data communications, and performing a backup function; and a control unit for changing the first connection mode to the second connection mode, on the basis of the storage status of new data stored on the mobile terminal, while connected to the mobile terminal.

19 Claims, 28 Drawing Sheets

(51) Int. Cl.
*H04M 19/08* (2006.01)
*G06F 1/26* (2006.01)
*H02J 7/00* (2006.01)
*H02J 7/04* (2006.01)

(52) U.S. Cl.
CPC ......... *H02J 7/045* (2013.01); *H04M 1/72527* (2013.01); *H04M 19/08* (2013.01); *H02J 2007/0062* (2013.01); *H02J 2007/0096* (2013.01)

(58) Field of Classification Search
USPC ........ 320/101, 114, 107; 307/31; 324/76.11; 348/155; 455/414.1, 551, 130, 418
See application file for complete search history.

(56) References Cited

U.S. PATENT DOCUMENTS

| | | | |
|---|---|---|---|
| 2013/0002192 A1 | 1/2013 | Fischbach et al. | |
| 2013/0207602 A1 | 8/2013 | Fukaya | |
| 2013/0238920 A1* | 9/2013 | Harris | G06F 1/3206 713/323 |
| 2014/0091623 A1* | 4/2014 | Shippy | H02J 7/0019 307/31 |
| 2014/0198224 A1* | 7/2014 | Kim | G06F 3/005 348/207.1 |
| 2015/0137791 A1* | 5/2015 | Remple | G01N 27/00 324/76.11 |
| 2016/0186973 A1* | 6/2016 | Chien | F21S 8/035 362/253 |

FOREIGN PATENT DOCUMENTS

| | | |
|---|---|---|
| KR | 10-2004-0044714 A | 5/2004 |
| KR | 10-2013-0097198 A | 9/2013 |

* cited by examiner

CHARGING DEVICE, METHOD FOR CONTROLLING CHARGING DEVICE, AND MOBILE TERMINAL CONNECTED TO SAME

CROSS REFERENCE TO RELATED APPLICATIONS

This application is the National Phase of PCT International Application No. PCT/KR2016/009106, filed on Aug. 18, 2016, which claims priority under 35 U.S.C. 119(a) to Patent Application No. 10-2015-0116221, filed in the Republic of Korea on Aug. 18, 2015, and to Patent Application No. 10-2016-0104396, filed in the Republic of Korea on Aug. 17, 2016, all of which are hereby expressly incorporated by reference into the present application.

TECHNICAL FIELD

The present disclosure relates to a charging device connected to a mobile terminal and a control method thereof.

BACKGROUND ART

A terminal may be divided into a mobile terminal (mobile/portable terminal) and a stationary terminal according to whether the terminal may be moved. The mobile terminal may be divided into a handheld terminal and a vehicle mounted terminal according to whether the user may carry the mobile phone directly.

Such a terminal has various functions according to the development of technologies. For example, a terminal is implemented in the form of a multimedia device having a plurality of functions such as capturing images or video, playing a music or video file, playing a game, and receiving broadcast. Further, in order to support and enhance the functions of the terminal, improvement of a structural and/or software part of the terminal may be considered.

Further, as the frequency of use of the mobile terminal increases, the amount of data stored in the mobile terminal increases and important data is frequently stored in the mobile terminal. As a result, an operation of performing backup and restoring data stored in the mobile terminal is an essential part in using the mobile terminal.

However, in the related art, backup and restoration of such data is mainly performed through software installed separately in a computer. Thus, the process of performing backup and restoring data is complicated or difficult for an elderly person or a child who is inexperienced in using an electronic device.

DISCLOSURE

Technical Problem

An aspect of the present disclosure provides a charging device which maintains a good charging state in charging a battery without a specific control command of a user, while performing backup of data.

Technical Solution

According to an aspect of the present disclosure, there is provided a charging device including: a body connectable to a mobile terminal; a charging unit charging the mobile terminal in a first connection mode; a backup unit performing backup function upon receiving data stored in the mobile terminal in a second connection mode in which data communication is available; and a controller switching the first connection mode to the second connection mode on the basis of whether new data is stored in the mobile terminal in a state in which the charging device is connected to the mobile terminal.

In an embodiment, the controller may execute the charging function in the first connection mode for a first time and switch the first connection mode to a second or third connection mode to perform the backup function for a second time, and the first connection mode and the second or third connection mode may be alternately activated until when there is no more data to be received or when it reaches a fully charged state. Thus, the backup function may be performed, while a charge state of a battery is stably maintained.

In an embodiment, after the specific time has lapsed, the controller detect whether there is data to be received from the mobile terminal and determines whether to perform the charging function or the backup function, and thus, when the backup function is not necessary, power may be supplied to the battery rapidly.

In an embodiment, when the charging device and the terminal body are connected, the memory may be controlled to back up at least a portion of data stored in the terminal body on the basis of whether the connected terminal body is a previously registered terminal body, and thus, data may be received from the registered terminal.

In an embodiment, when the previously registered terminal body is in plurality, the memory may be controlled to separately store data backed up from each terminal body, and thus, the backup function may be performed by differentiating data of the plurality of terminals.

In an embodiment, the charging device may further include a receptacle formed to be depressed in the body and the receptacle includes a socket which may protrude outwards by an external force, and thus, backup data may be transmitted to an external device or recovered to a mobile terminal again.

Advantageous Effects

According to the present disclosure, since the charging function and the backup function are performed together as the mobile terminal and the charging device are connected, the user may back up data through only connection for charging without having to apply a separate control command for the backup function to the mobile terminal or the charging device. Thus, the user may back up data frequently.

In addition, a high speed charging function is performed for a specific time and the first to third connection modes are alternately activated on the basis of the presence of data to be backed up, and thus, data may be backed up, as necessary, during low speed charging, while power is being supplied to the mobile terminal.

Since the charging function and the backup function are alternately activated, the backup function may be performed while maintaining a stable charging state, and as charging of the battery is in progress, time for backup may be increased, and thus, time for back up a large amount of data may be secured.

The data backup function is performed based on whether the connected terminal body is a previously registered terminal body. Thus, when the terminal body connected to the charging device is a pre-registered terminal body, the charging device may supply power to the terminal body and simultaneously back up data stored in the terminal body to the memory of the charging device. Accordingly, the data may be backed up at the same time when the previously registered terminal body is connected to the charging device, without any operation for the user to perform data backup.

Further, according to the present disclosure, the lighting unit provided in the charging device may output different colors or turned on differently, in order to inform whether data is backed up from the terminal body connected to the charging device and/or whether power is supplied to the terminal body and/or in order to indicate a remaining capacity of the memory. Accordingly, the user may intuitively notice a state of charge, a data backup completion state, and the like.

BEST MODES

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Also, hereinafter, in describing the accompanying drawings, in case where at least two images are illustrated in the form of 2 by 2 in one figure (FIG. N), an image illustrated on left upper portion will be referred to as a "first drawing", an image illustrated in a right upper portion will be referred to as a "second drawing", an image illustrated in a right lower portion will be referred to as a "third drawing", and an image illustrated in a left lower portion will be referred to as a "fourth drawing"

In addition, when at least two images are shown in a line in a downward direction in one figure (FIG. N), the images, starting from the uppermost one, will sequentially be referred to as "first drawing, second drawing, . . . ".

In addition, when at least two images are shown in a line in a rightward direction in one figure (FIG. N), the images, starting from the leftmost one, will sequentially be referred to as "first drawing, second drawing, . . . ".

Figure 1A:
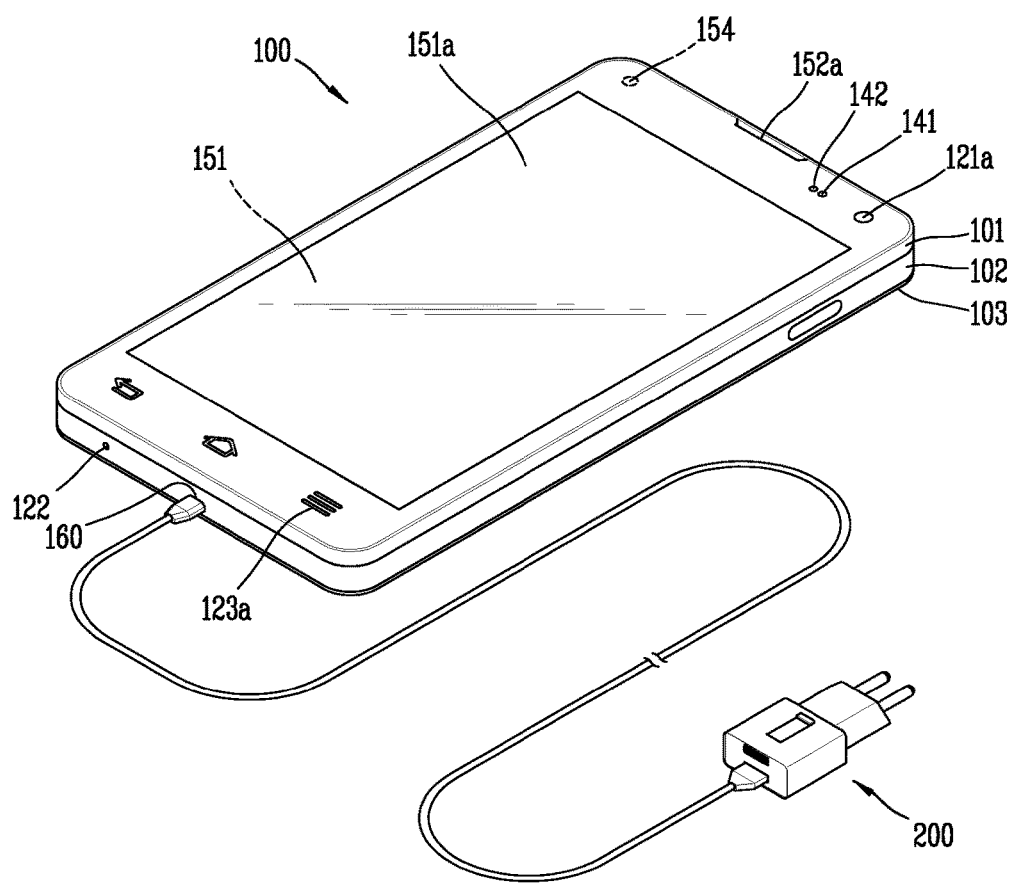
FIG. 1A is a conceptual diagram illustrating a way in which a terminal body and a charging device are connected according to the present disclosure.
Figure 1B:
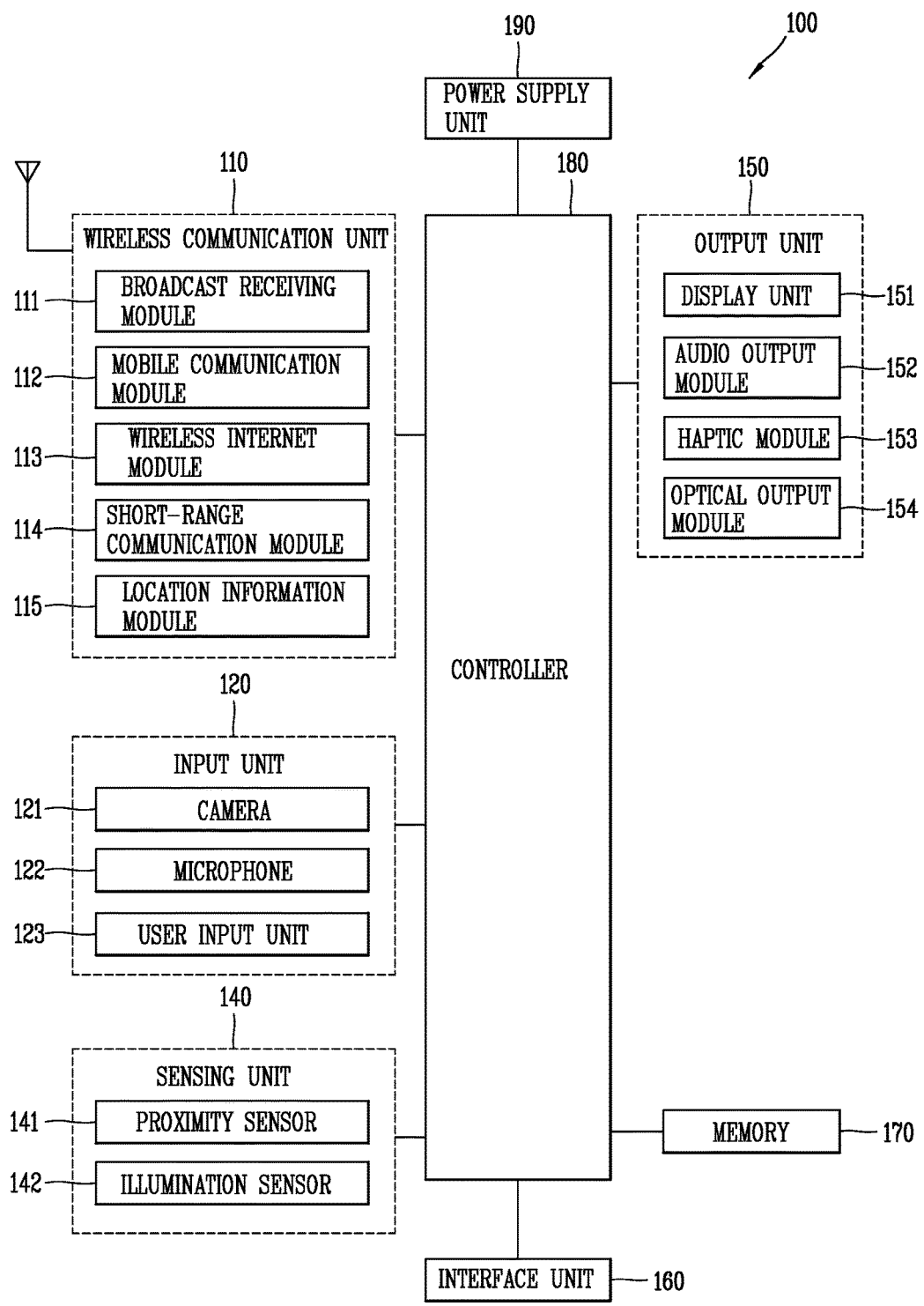
FIG. 1B is a block diagram illustrating components of a mobile terminal according to an embodiment of the present disclosure connected to a charging device of the present disclosure.
Figure 1C:
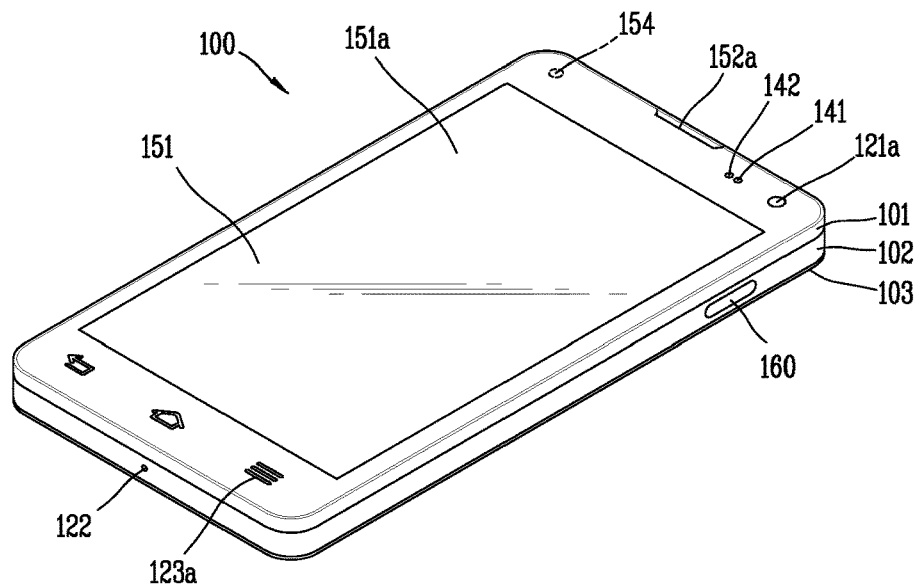
FIGS. 1C and 1D are conceptual diagrams illustrating an example of the mobile terminal of FIG. 1A viewed in different directions.
Figure 1D:
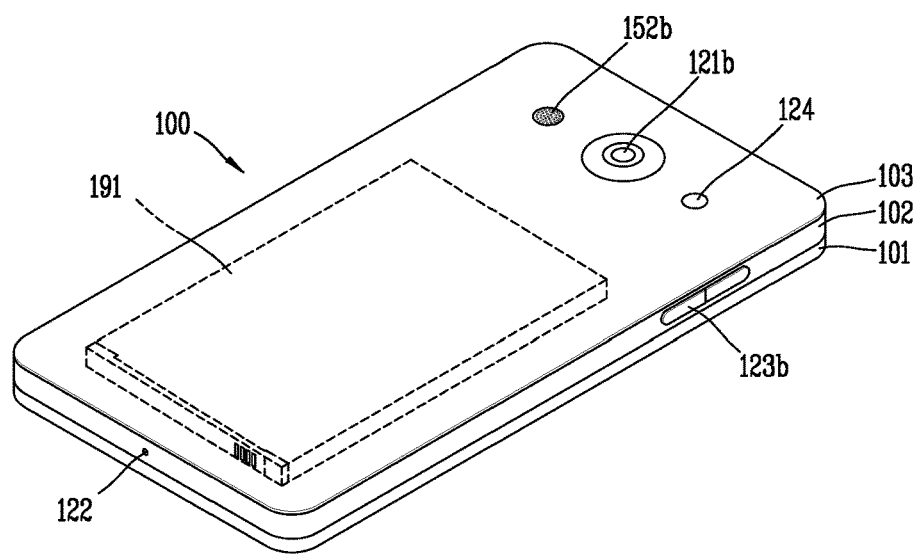

FIG. 1A is a conceptual diagram for explaining a connection method between a terminal main body and a charging device according to the present invention. 1B is a block diagram illustrating components of a mobile terminal according to an exemplary embodiment of the present invention. FIG. 10 and FIG. 1D are conceptual diagrams illustrating mobile terminals of FIG. 1A in different directions FIG. 1A is a conceptual diagram illustrating a way in which a terminal body and a charging device are connected according to the present disclosure. FIG. 1B is a block diagram illustrating components of a mobile terminal according to an embodiment of the present disclosure connected to a charging device of the present disclosure. FIGS. 1C and 1D are conceptual diagrams illustrating an example of the mobile terminal of FIG. 1A viewed in different directions.

The terminal body 100 related to the present invention may be connected to a charging device 200. Here, as described above, the charging device 200 may include an AC adapter and/or an external battery that converts external AC power to DC power. That is, the charging device 200 according to the present invention may be any type as long as it is a device connected to the mobile terminal and capable of supplying power to the battery of the mobile terminal.

That is, the charging device 200 backs up at least a part of the data stored in the terminal body 100 connected to the charging device 200, to a memory 210.

The terminal body 100 of the mobile terminal and the charging device 200 may be connected through any one of various connection methods to transmit and receive data to and from each other.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Referring to FIGS. 1A-1D, the mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

A structure of the mobile terminal 100 according to an embodiment of the present disclosure described above with reference to FIG. 1B or a terminal including the aforementioned components will be described with reference to FIGS. 1C and 1D.

Referring now to FIGS. 1C and 1D, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

FIGS. 1C and 1D depict certain components as arranged on the mobile terminal. However, it is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 10, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1B) may be retractable into the terminal body. Alternatively, an antenna may be formed using a film attached to an inner surface of the rear cover 103, or a case that includes a conductive material.

A power supply unit 190 (refer to FIG. 1B) for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, embodiments related to a control method which may be implemented in the mobile terminal 100 constructed as above will be described with reference to the accompanying drawings. It will be apparent to those skilled in the art that the present disclosure may be embodied in other specific forms without departing from the spirit or essential characteristics thereof.

The terminal body 100 may be connected to a charging device 200 through an interface unit 160 wiredly. More specifically, the terminal body 100 may be connected to the charging device 200 through a universal serial bus on-the-go (USB OTG) method. When the charging device 200 is connected to the interface 160, the terminal body 100 may perform appropriate control related to the connected charging device 200.

When the terminal body 100 and the charging device 200 communicate with each other via the USB OTG method, the terminal body 100 and the charging device 200 may be able to perform high speed communication or a large-capacity communication.

In another example, the terminal body 100 may be connected to the charging device 200 wirelessly via a wireless communication unit. The terminal body 100 may be connected to the charging device 200 via short-range communication using the short-range communication module 114 to transmit or receive data. As described above, the short-range communication module 114, serving for short-range communication, may support short-range communication using at least one of Bluetooth™, a radio frequency identification (RFID), infrared data association (IrDA)), ultra wideband (UWB), ZigBee, near field communication (NFC), wireless-fidelity (Wi-Fi), Wi-Fi Direct, and wireless USB. The short-range communication module may support wireless communication with the charging device 200 through a wireless area network (WAN). The WAN may be a short-range wireless personal area network.

In this manner, the terminal body 100 may be connected to the charging device 200 wiredly or wirelessly. Meanwhile, the charging device 200 related to the present disclosure may receive authentication information (or identification information) from the terminal body 100 connected wiredly or wirelessly.

Here, the authentication information or the identification information of the terminal body 100 is unique information of the terminal body 100, with which the connected terminal body 100 may be identified by the terminal body 100. The authentication information may include at least one of product identification (PID), service set identifier (SSID), connection security method information, and a password.

In the meantime, the mobile terminal according to the present disclosure may be connected to a charging device to receive power through the charging device. In other words, the terminal body may be connected to the charging device to receive power through the charging device.

Here, the charging device may include at least one of an AC adapter and an external battery for converting external AC power to DC power. That is, the charging device according to the present disclosure may be any device connected to the terminal body and capable of supplying power to the battery of the terminal body.

Here, the charging device includes a power supply unit. The charging device supplies power to the battery of the terminal body through the power supply unit. Further, when the charging device is configured as an AC adapter, the power supply unit may include a current converting unit which converts AC into DC.

The charging device according to the present disclosure performs a data backup function, as well as the charging function described above. That is, according to the present disclosure, the charging device may be connected to the terminal body and perform a data backup function to store data stored in the terminal body in the charge. To this end, the charging device includes a separate controller and a memory.

Specifically, in the present disclosure, while the terminal body is being charged, data stored in the terminal body may be transmitted to the charging device. Further, as the data stored in the terminal body is transmitted to the charging device, the transmitted data may be stored in the charging device.

Here, the terminal body and the charging device may be connected through the interface unit described above. Alternatively, in case where the terminal body is to be charged by the charging device through a wireless charging method, the terminal body and the charging device may be connected through wireless communication.

In the present disclosure, when it is stated that "the terminal body and the charging device are connected", it may refer to that the terminal body and the charging device are connected to transmit and receive data to or from each other. That is, "the terminal body and the charging device are connected" refers to that the terminal body and the charging device are in a communicatable state.

Hereinafter, a method of providing a backup function of data stored in the terminal body through the charging device in which backup data for data stored in the terminal body is stored will be described in detail with reference to the accompanying drawings.

Figure 1E:
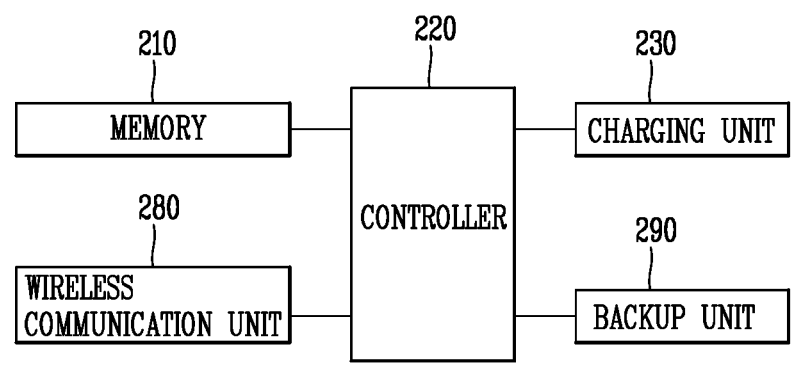
FIG. 1E is a conceptual diagram illustrating components of a charging device according to an embodiment of the present disclosure.

FIG. 1E is a conceptual diagram illustrating components of a charging device according to an embodiment of the present disclosure.

The charging device 200 according to the present embodiment includes a controller 220 including a host chip for data transmission. The charging device 200 includes a charging unit 201 performing a charging function by implementing mutually different connection modes and a backup unit receiving data and storing the received data in a memory or a predetermined server.

The backup unit 290 refers to a circuit which performs a data receiving function in a connected mode in which data transmission can be performed, and the charging unit 201 refers to a circuit which performs a function of supplying power in a specific connection mode.

The charging device 200 according to an embodiment of the present disclosure may further include a memory 210 for storing received data and/or a wireless communication module 280 for transmitting data by performing wireless communication with a specific server have.

The memory 210 may be implemented as at least one of a flash memory type, a hard disk type, a solid state disk type, a silicon disk drive (SDD) type), a multimedia card micro type, a card type memory (e.g., an SD or XD memory, etc), a random access memory (RAM), a static random access memory (SRAM), a read-only memory (ROM), an electrically erasable programmable memory read-only memory (EEPROM), a programmable read-only memory (PROM), a magnetic memory, a magnetic disk, and optical disk.

Figure 2A:
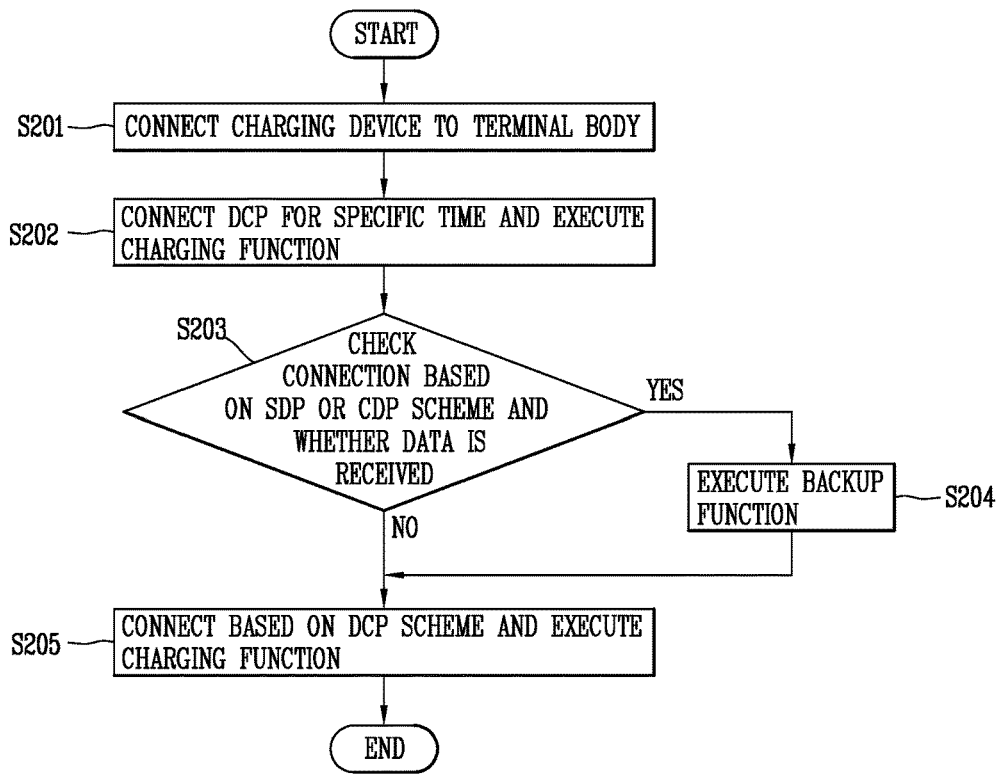
FIG. 2A is a conceptual diagram illustrating a method for controlling a charging device according to an embodiment of the present disclosure.

FIG. 2A is a conceptual diagram illustrating a control method of a charging device according to an embodiment of the present disclosure.

Referring to FIG. 2A, when the charging device 200 is connected to the main body of the mobile terminal 100 (S201), a first connection mode is activated for a specific time and a charging function is executed (S202). In the first connection mode, the controller 220 connects the charging device 200 and the mobile terminal 100 using a dedicated charging port (DCP) method.

In the DCP scheme, D+ and D− are short-circuited to cut off data communication, and in this state, power of about 1.5 A is supplied to the mobile terminal body 100. In a connection mode of the DCP scheme, the mobile terminal 100 is charged at a relatively high speed.

Here, the specific time may be determined based on user setting or may be determined by capacity of a battery installed in the mobile terminal 100, the presence or absence of data which is stored in the memory 170 of the mobile terminal 100 and requires backup. Here, the data requiring backup may be data which has not been received by the charging device 200 or which has been newly stored after recent backup by the charging device 200.

When the predetermined time has elapsed, the controller 220 switches the first connection mode to a second or third connection mode, and checks whether there is data requiring backup (S203). Here, the second connection mode corresponds to a state in which the charging device 200 and the mobile terminal body 100 are connected according to a standard downstream port (SDP) scheme, and the third connection mode corresponds to a state in which the charging device 200 and the mobile terminal body 100 are connected according to a charging downstream port (CDP) scheme.

The SDP scheme is a scheme of supplying power at a maximum speed of about 500 mA/s, while performing data communication. The CDP scheme is a scheme of supplying power of a maximum of about 1.5 A, while performing data communication.

The controller 220 determines whether data is received from the mobile terminal 100 in the second connection mode or the third connection mode (S203). In the second or third connection mode, when data is received from the mobile terminal 100, a data backup function is executed, while the second or third connection mode is maintained (S204).

In this embodiment, the charging device 200, as a host, transmits a transmission request command requesting transmission of data to the mobile terminal 100 as a host. therefore, If data is not received from the mobile terminal 100 in the second or third connection mode, the controller 220 connects the charging device to the mobile terminal 100 according to the DCP scheme and executes a charging function (S205). That is, when there is no data to be backed up, the controller 220 switches the second or third connection mode to the first connection mode to interrupt data communication and perform a high speed charging function.

Since the controller 220 performs both the charging function and the backup function as the mobile terminal 100 and the charging device 200 are connected, although the user does not applying a separate control command for the backup function, data may be backed up only through the connection for charging. Accordingly, the user may back up data frequently.

In addition, since the high speed charging function is performed for a predetermined time and the first to third connection modes are alternately activated on the basis of the presence of data to be backed up, data may be backed up as necessary at the time of low speed charging, while power is being supplied to the mobile terminal.

Figure 2B:
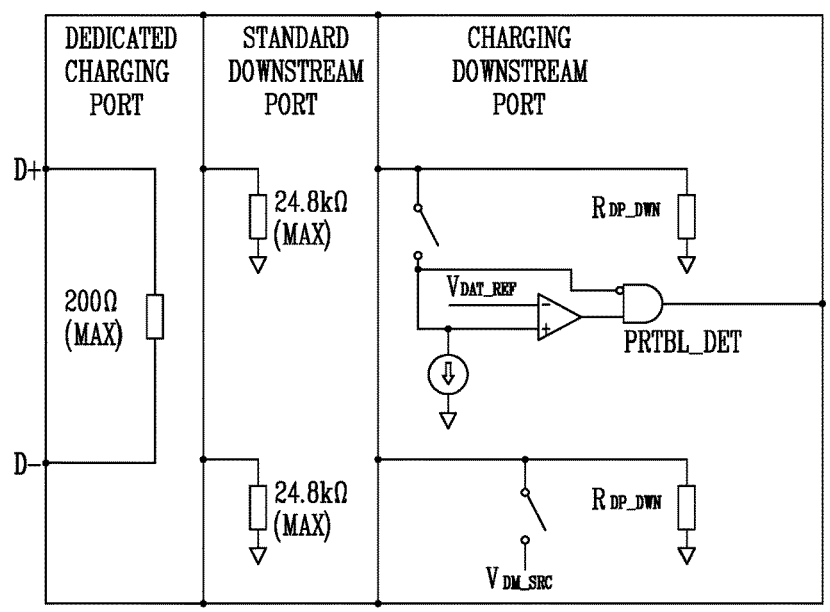
FIG. 2B is a conceptual diagram illustrating connection structures of a dedicated charging port (DCP) scheme, a standard downstream port (SDP) scheme, and a charging downstream port (CDP) scheme.

FIG. 2B is a conceptual diagram illustrating a connection structure of the DCP scheme, the SDP scheme, and the CDP scheme.

In the DCP scheme, D+ and D− are short-circuited to interrupt data communication, and in this state, it is impossible to receive data. The connected device may recognize the SDP by detecting that a 15 kΩ pull-down resistor is connected to both the D+ and D− terminals and the USB data lines.

The DCP scheme provides up to 1.5 A of power and includes a pull-down resistor of up to 15 kΩ required for communication between D+ and D−. A device connected to the CDP detects the CDP by a hardware method through adjustment and monitoring of the D+ and D− lines. Such hardware testing is performed before tuning a data line through a USB transceiver. The DCP includes an internal circuit switched in a charging detection step, and a terminal connected through the internal circuit of the charging device based on the DCP scheme may be discriminated from the CDP scheme.

Data received from the mobile terminal 100 by the backup function may be stored in the memory 210 of the charging device 200. The data stored in the memory 210 may be transmitted to the mobile terminal 100 or to an external device.

That is, the charging device 200 related to the present disclosure may be directly connected to an external PC, or the like, and transmit data stored in the memory 210 thereof to an external PC, or the like. To this end, the charging device 200 includes a socket which may be inserted into the external PC, or the like. This will be described in detail hereinafter with reference to the drawings.

Figure 3A:
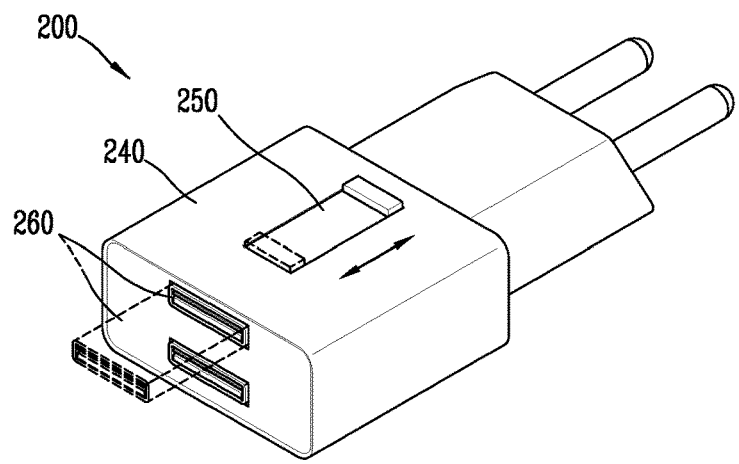
FIG. 3A is a perspective view of a charging device according to an embodiment of the present disclosure.
Figure 3B:
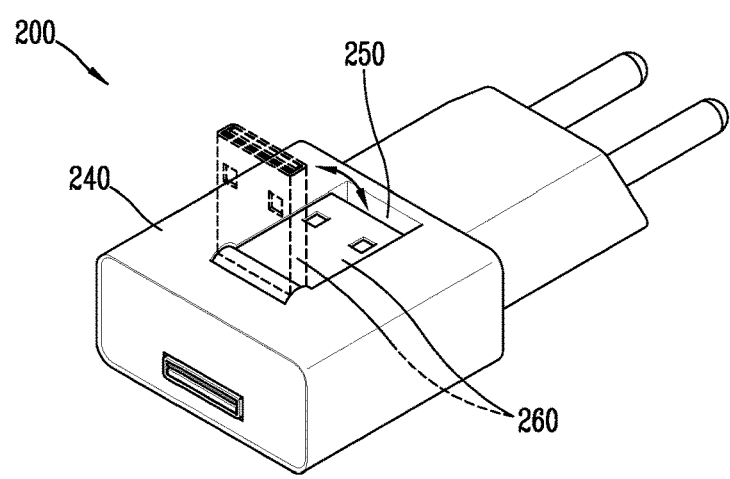
FIG. 3B is a perspective view of a charging device according to another embodiment of the present disclosure.

FIG. 3A is a perspective view of a charging device 200 according to an embodiment of the present disclosure, and FIG. 3B is a perspective view of a charging device 200 according to another embodiment of the present disclosure.

The charging device 200 according to the present disclosure may include a body 240 forming an appearance and a receptacle 250 formed to be depressed in the body 240. In addition, the receptacle 250 may receive a socket 260 provided to protrude outwards by an external force.

Referring to FIG. 3A, the socket 260 may be slidable in the receptacle 250. In this case, the socket 260 may be formed to slide substantially in a direction parallel to the body 240. When the socket 260 completely slides to the inner side of the receptacle 250, the socket 260 is fully recessed into the body 240. When the socket 260 completely slides out of the receptacle 250, the socket 260 protrudes from the body 240.

Referring to FIG. 3B, the socket 260 may be hinged-coupled to one side of the receptacle 250. In this case, the socket 260 may be formed to be rotatable from a main surface of the body 240. That is, when the socket 260 is disposed in parallel with the main surface of the body 240, the socket 260 is completely depressed in the receptacle 250. When the socket 260 is rotated to be substantially perpendicular to the main surface of the body 240, the socket 260 protrudes outwards from the body 240.

Referring to FIGS. 3A and 3B, in a state in which the socket 260 protrudes outwards from the body 240, the socket may be inserted into an interface unit of an external PC, or the like. Accordingly, the charging device 200 may be directly connected to the external PC, or the like, to transmit data stored in the memory 210 thereof to the external PC, or the like.

Meanwhile, as described above, the charging device 200 according to the present disclosure backs up data stored in the terminal body 100, simultaneously when it supplies power to the terminal body 100 connected thereto. That is, the charging device 200 according to the present disclosure simultaneously performs the charging function and the backup function. This will be described in more detail with reference to FIGS. 4A and 4B.

Figure 4A:
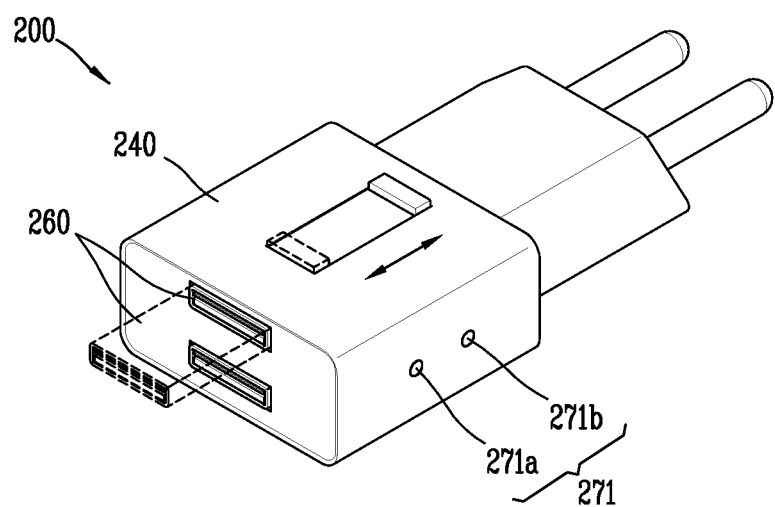
FIGS. 4A and 4B are conceptual diagrams illustrating a control method of indicating execution of a charging function and a backup function and a structure of a charging device according to an embodiment of the present disclosure.
Figure 4B:
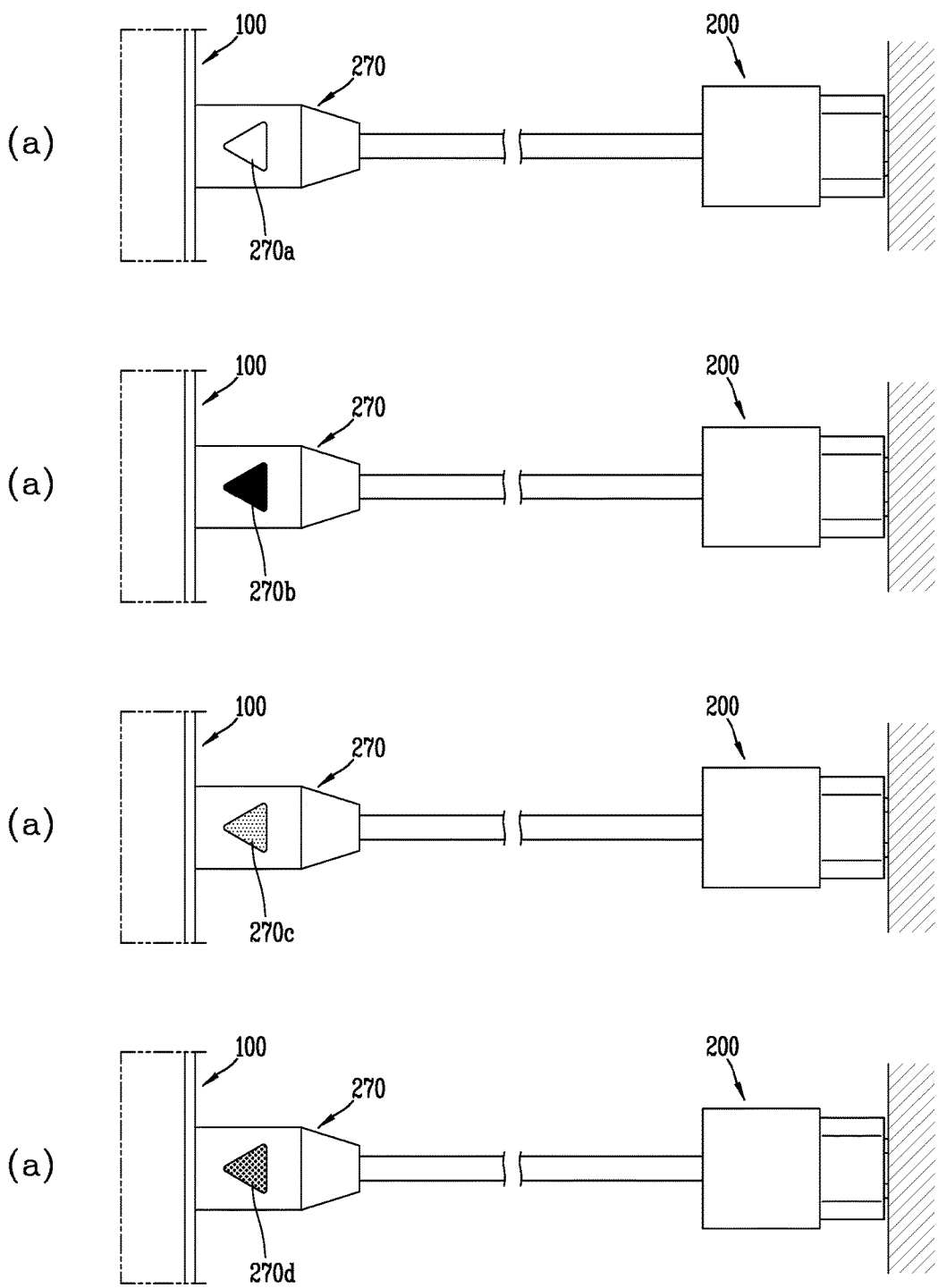

FIGS. 4A and 4B are conceptual diagrams illustrating a structure of a charging device and a control method for notifying about execution of a charging function and a backup function according to an embodiment of the present disclosure.

FIG. 4A is a conceptual diagram illustrating a lighting unit controlled according to a charging function and a backup function according to an embodiment of the present disclosure.

The lighting unit 271 may be disposed on one side of the body including the socket 260. For example, the lighting unit 271 may be provided on the body 240. The lighting unit 271 may include first and second light emitting regions 271a and 271b. When only the charging function is performed in the first connection mode, the first light emitting region 271a emits light. When the backup function and the charging function are performed together in the second or third connection mode, the second light emitting region 271b emits light. The light may be emitted in different patterns and different colors depending on a charging state and a backup state of data.

The lighting unit 271 may be configured as at least one LED.

Although not shown, the controller 220 may interrupt or control at least one of the charging function and the backup function by applying a control command to the mobile terminal 100, upon checking light emitted from the lighting unit 271. For example, when a control command related to interruption of the data backup function is applied through the mobile terminal 100, while light is being output from the second light emitting region 271b, the controller 220 may switch the second or third connection mode to the first connection mode and control the first light emitting region 271a to emit light.

Accordingly, the user may notice a function currently performed by the charging device 200, through the lighting unit.

FIG. 4B is a conceptual diagram related to AN operation of the lighting unit 270 of the charging device 200 related to the present disclosure.

The charging device 200 according to the present disclosure further includes a lighting unit 270. Specifically, the lighting unit 270 may be configured as an LED lamp, or the like. The lighting unit 270 may be provided in the body 240 of the charging device 200 or may be provided on one side of a cable connectable to the charging device 200.

When the charging device 200 and the terminal body 100 are connected, the lighting unit 270 may be turned on in at least one color. In detail, the lighting unit 270 may be turned on in various colors depending on a charging state and a data backup state of the terminal body 100 connected to the charging device 200.

In detail, the controller 220 may control the lighting unit 270 to output different colors based on whether data is backed up from the terminal body 100 connected to the charging device 200 and/or whether power is supplied to the terminal body 100.

For example, referring to (a) of FIG. 4B, in case where the charging device 200 and the terminal body 100 are connected to each other and the terminal body 100 receives power from the charging device 200 and data of the terminal body 100 is simultaneously backed up to the charging device 200, first lighting 270a may be turned on in the lighting unit 270.

Also, referring to (b) of FIG. 4B, in case where the charging device 200 and the terminal body 100 are connected to each other and the terminal body 100 receives power from the charging device 200 but data of the terminal body 100 has been completely backed up to the charging device so data is not currently transmitted, second lighting 270b may be turned on in the lighting unit 270.

Referring to (c) of FIG. 4B, when the charging device 200 and the terminal body 100 are connected to each other and data of the terminal body 100 is being backed up to the charging device 200, and in this state, if charging of the terminal body 100 is completed so power is not supplied from the charging device 200 to the terminal body 100 any longer, third lighting may be turned on in the lighting unit 270.

Also, referring to (d) of FIG. 4B, in case where the charging device 200 and the terminal body 100 are connected to each other and charging of the terminal body 100 and data backup are completed, fourth lighting 270d may be turned on in the lighting unit 270.

The first to fourth lightings may be turned on in different colors or may be different in lighting method. The user may intuitively notice a charging state, a data backup completion state, and the like, through the first to fourth lightings.

Meanwhile, the backup data is stored in the memory 210 of the charging device 200 while the backup function is being executed. The lighting units 271 and 270 may be controlled to notify about a storage capacity of the memory 210. Hereinafter, a control method of notifying about a remaining capacity of a storage space of the memory 210 according to various embodiments will be described with reference to FIGS. 5A to 5C.

Figure 5A:
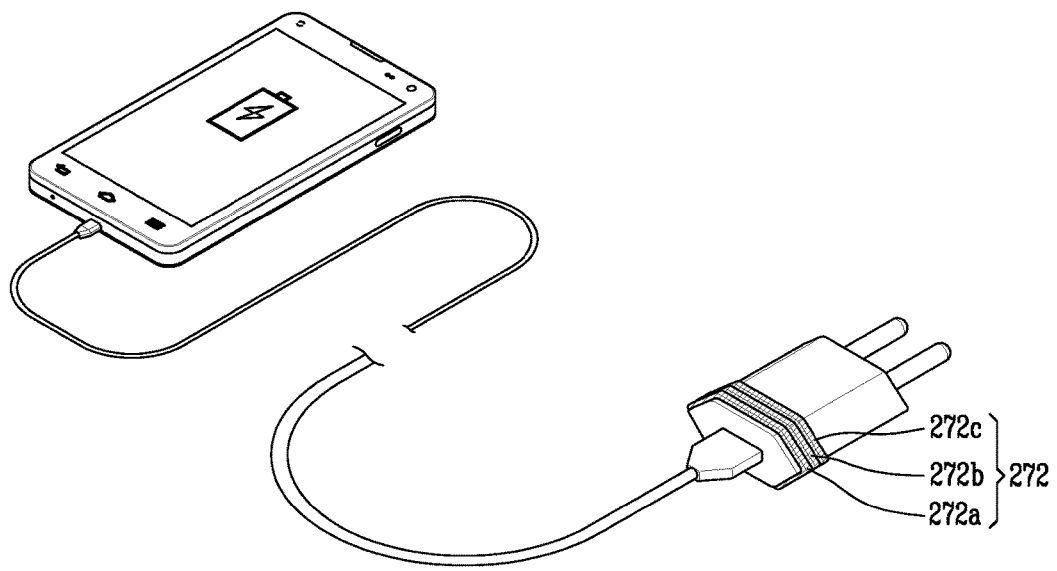
FIGS. 5A and 5B are conceptual diagrams illustrating a lighting unit according to another embodiment.
Figure 5B:
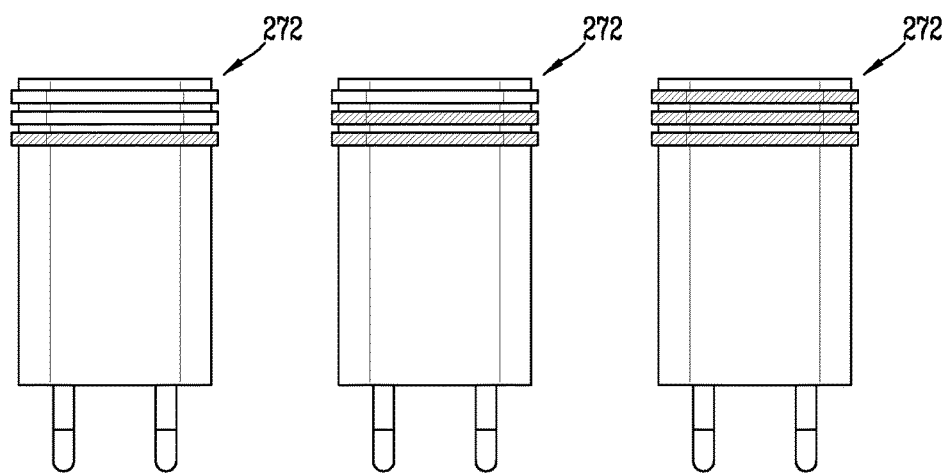

FIGS. 5A and 5B are conceptual diagrams illustrating a lighting unit according to another embodiment.

Referring to FIGS. 5A and 5B, a lighting unit 272 may include first to third light emitting regions 272a, 272b, and 272c. However, the number of light emitting regions included in the lighting unit 272 is not limited thereto. For example, the first to third light emitting regions 272a, 272b, and 272c may be formed in a strip shape arranged in parallel with each other.

The lighting unit 272 according to the present embodiment indicates a remaining capacity of a storage space of the memory 210. For example, as the remaining capacity is greater, the controller 220 may control a larger number of the light emitting regions to emit light. In addition, light in different colors may be output according to the remaining capacity.

For example, in case where the storage space is 25%, only the first light emitting region 272a may emit light. When 50% is left, the first and second light emitting regions 272a and 272b may emit light. When the storage space is 75% or greater, the third light emitting regions 272a, 272b, and 272c may emit light.

The controller 220 may control the lighting unit 272 to emit light in a state in which the charging device 200 is connected to the mobile terminal 100.

Accordingly, the user may intuitively check the remaining capacity of the memory included in the charging device 200.

Figure 5C:
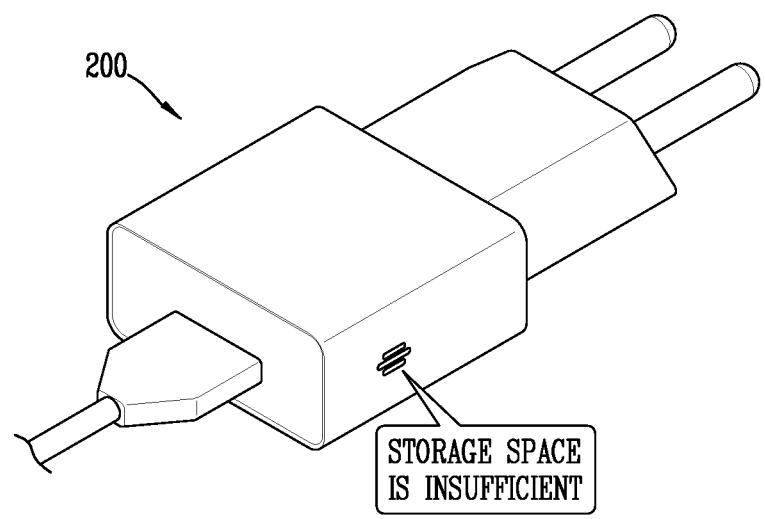
FIG. 5C is a conceptual diagram illustrating a control method of outputting a storage capacity of a memory by voice according to another embodiment.

FIG. 5C is a conceptual diagram illustrating a control method of outputting a storage capacity of a memory by voice according to another embodiment.

The charging device 200 according to an embodiment of FIG. 5C may include an audio output module (not shown). In case where the remaining capacity of the storage space of the memory 210 is less than a preset reference capacity, the controller 220 controls the audio output module to output voice information indicating that the remaining capacity is insufficient.

The controller 220 may control the audio output module to output the voice information each time the mobile terminal 100 is connected or at a specific time. The specific time may be changed based on the remaining capacity. That is, as the remaining capacity is smaller, voice information may be output more frequently.

The charging device 200 according to the present disclosure may include both or selectively the lighting unit and the audio output module.

The charging device 200 connected to the mobile terminal 100 may perform the charging function of supplying power and the backup function of receiving and storing data together or selectively. Hereinafter, a control method of the charging device 200 for performing the backup function and the charging function according to specific embodiments will be described.

Figure 6A:
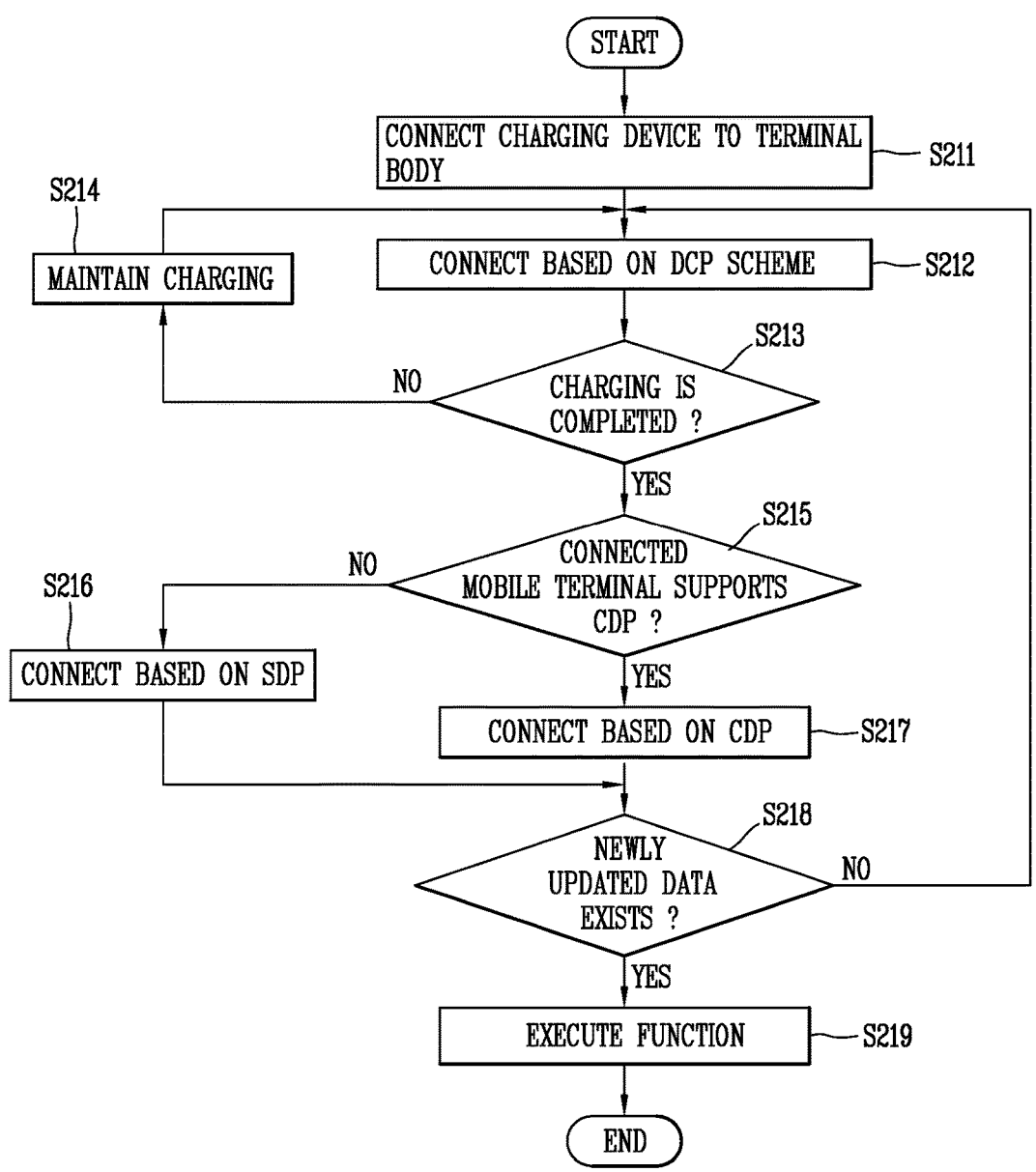
FIG. 6A is a conceptual diagram illustrating a method for controlling a charging device according to an embodiment.

FIG. 6A is a conceptual diagram illustrating a control method of a charging device according to an embodiment.

Referring to FIG. 6A, when the main body of the mobile terminal 100 is connected to the charging device 200 (S211), the first connection mode is activated (S212). In the first connection mode, the mobile terminal and the charging station are connected according to the DCP scheme to perform a high speed charging function.

After the lapse of a specific time, the controller 220 determines whether charging of the battery of the mobile terminal 100 has been completed (S213). Completion of the charging may be determined based on a lapse time during which the charging function has been performed or power amount information output by a measurement sensor which is installed in the charging device 200 or the mobile terminal 100 to measure an amount of power.

When it is determined that the charging has not been completed, the controller 220 maintains the first connection mode and continues to perform the charging function (S214). Meanwhile, when it is determined that the charging has been completed, the controller 220 determines whether the connected mobile terminal 100 supports the CDP scheme (S215). That is, the controller 220 may determine whether the mobile terminal 100 recognizes the CDP-based connection.

If the mobile terminal does not support the CDP scheme, the controller 220 switches to the third connection mode and connects the charging device 200 and the mobile terminal according to the SDP scheme in the third connection mode.

However, if the connected mobile terminal supports the CDP scheme, the controller 220 switches to the second connection mode. In the second connection mode, the charging device 200 and the mobile terminal are connected according to the CDP scheme (S217).

In the second or third connection mode, the controller 220 determines whether there is newly updated data (S218).

If newly updated data exists, the controller 220 receives data from the mobile terminal 100 and performs a backup function. The charging function is performed at a low speed while the data is being received in the second connection mode.

If newly updated data does not exist, the controller 220 switches the second or third connection mode to the first connection mode. When the first connection mode is activated, the data communication is interrupted and only the charging function is performed.

According to the present embodiment, whether or not the connection based on the CDP scheme in which a charging rate is relatively high is supported is first determined, and only when the connection based on the CDP scheme is not supported, connection is made according to the SDP scheme. Thus, the mobile terminal may be charged at a higher rate, while data communication is being performed, as possible.

performed by the SDP scheme only when the connection is not supported. Therefore, it is possible to perform the battery of the mobile terminal at a higher speed while performing data communication.

In addition, when the backup function is not required, it is possible to switch to the DCP scheme to induce faster charging.

Figure 6B:
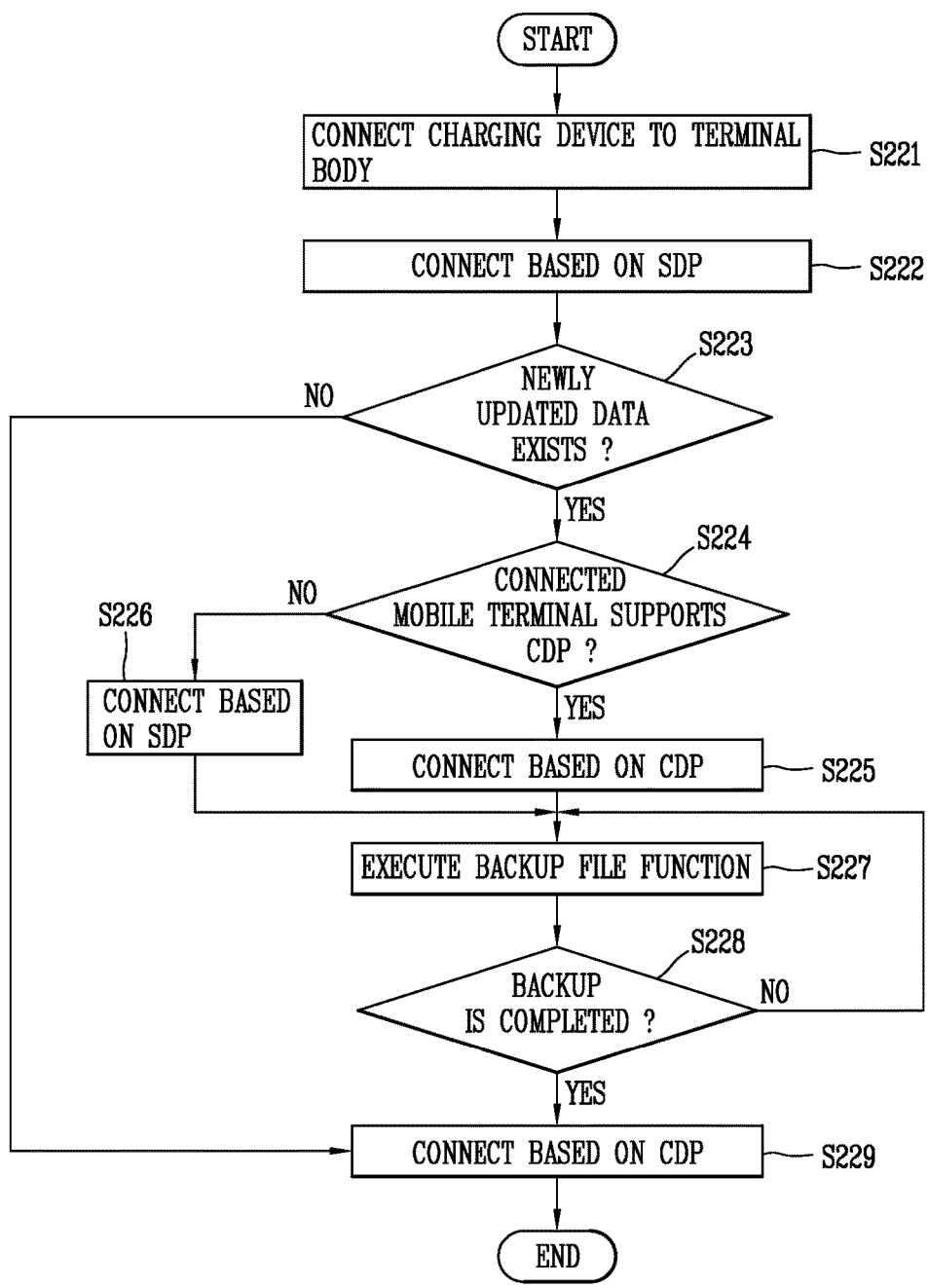
FIG. 6B is a conceptual diagram illustrating a method for controlling a charging device according to another embodiment.

FIG. 6B is a conceptual diagram illustrating a control method of a charging device according to another embodiment.

Referring to FIG. 6B, when the main body of the mobile terminal 100 is connected to the charging device 200 (S221), the controller 220 activates the third connection mode (S222). In the third connection mode, the mobile terminal and the charging device 200 are connected according to the SDP scheme, and thus, data communication may be possibly performed. Since the low-speed charging function is enabled in the third connection mode, the mobile terminal 100 may receive power when the charging device 200 is connected thereto.

Since most terminal devices support the SDP scheme, the step of checking whether SDP is supported is unnecessary. Therefore, charging may be performed simultaneously when the charging device 200 is connected.

In addition, the controller 220 may check whether there is new data which has been updated as soon as the mobile terminal 100 is connected (S223). If it is determined that there is no updated data, the controller 220 switches the third connection mode to the first connection mode (S229).

The charging function may be performed at a high speed through the DCP scheme in the first connection mode. That is, if the backup function is unnecessary, the data communication function may be interrupted and fast charging may be performed.

If there is updated new data, the controller 220 determines whether the connected mobile terminal supports the CDP scheme (S224). If the mobile terminal supports the CDP scheme, the controller 220 switches to the second connection mode (S225), and if the mobile terminal does not support the CDP scheme, the controller 220 maintains the third connection mode (S226).

The controller 220 performs a backup function through data communication, while performing the charging function at a low speed in the second or third connection mode. When the backup of the data stored in the mobile terminal 100 is completed (S228), the controller 220 switches the second or third connection mode to the first connection mode. That is, when the backup is completed, the controller 220 connects the charging device and the mobile terminal again according to the DCP scheme and performs the charging function at a high speed.

According to the present embodiment, it is possible to check whether the backup function is necessary, while power is being supplied as soon as the mobile terminal is connected to the charging device 200 using the SDP scheme which can be applied regardless of terminal type.

Thus, the user preferentially performs data backup and charging the mobile terminal with low power together according to the necessity of the backup function, and when the backup is completed, the charging device switches the connection mode of the terminal and the charging device to the first connection mode, and thus, it is possible to switch to the high-speed charging without any separate control command.

Figure 7A:
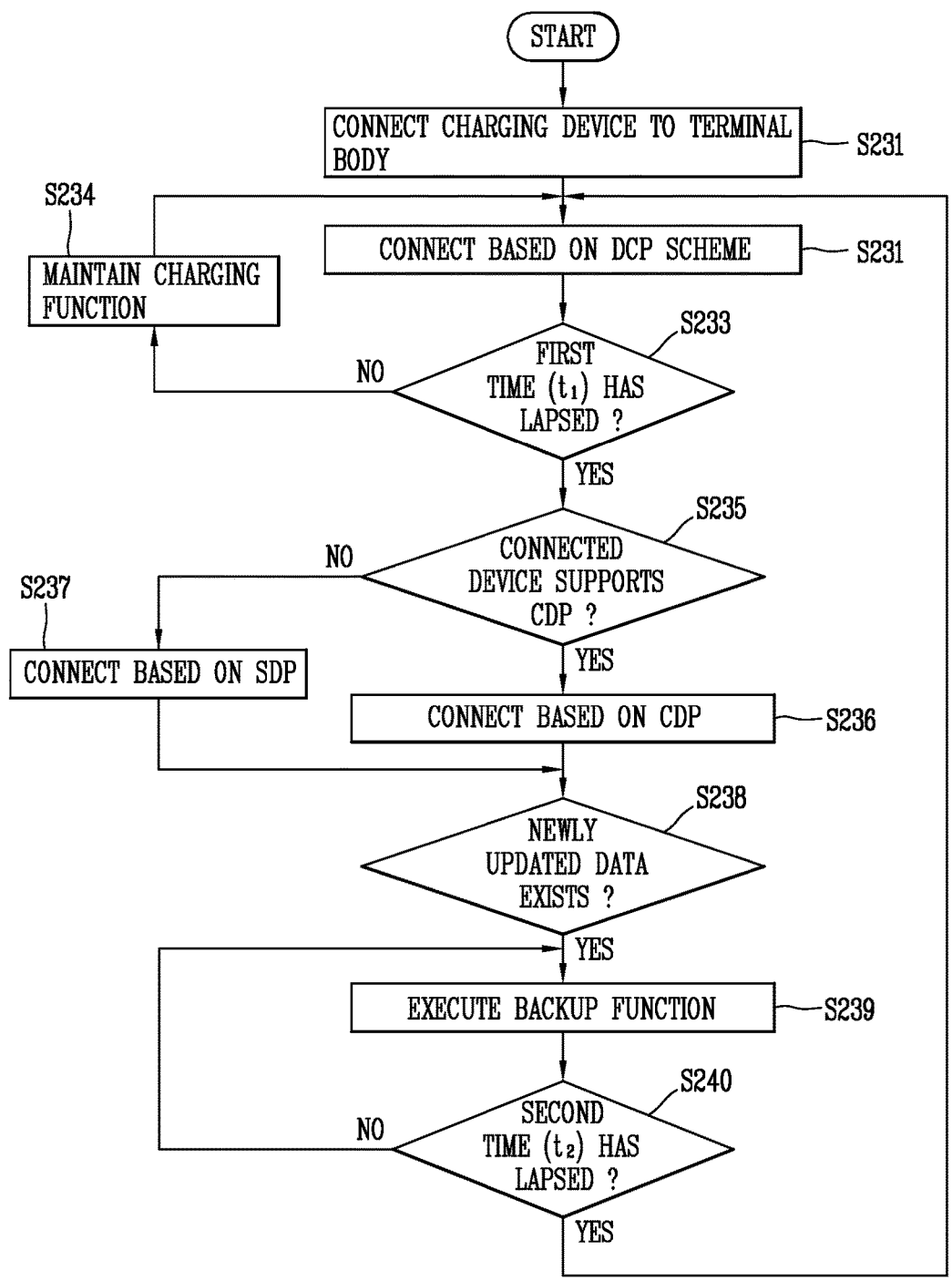
FIGS. 7A and 7B are conceptual diagrams illustrating a control method of changing an execution time of a backup function and a charging function.
Figure 7B:
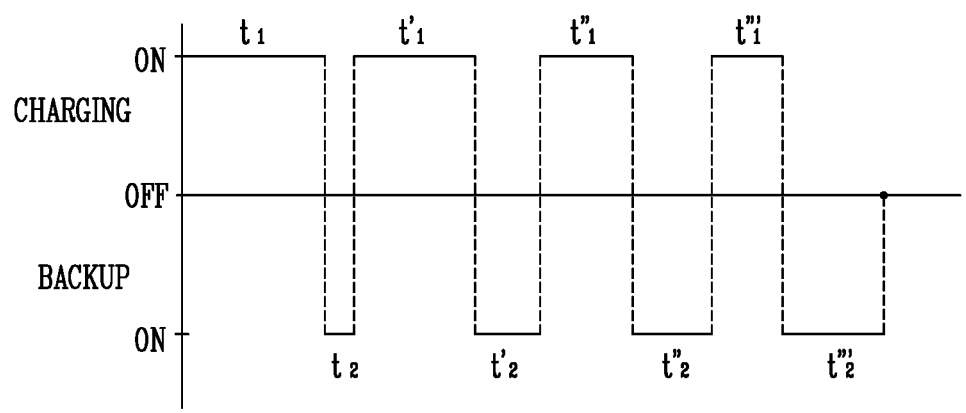

FIGS. 7A and 7B are conceptual diagrams illustrating a control method of changing an execution time of the backup function and the charging function.

Referring to FIGS. 7A and 7B, when the charging device 200 and the mobile terminal are connected (S231), the controller 220 activates the first connection mode (S232). That is, the mobile terminal and the charging device 200 are connected according to the DCP scheme and the charging function is performed at a high speed (S232).

The controller 220 performs the charging function according to the DCP scheme for a preset first time t1 (S233). The first time t1 may be set to a time for charging minimum power for performing a basic function in a power ON state in a state in which the battery of the mobile terminal 100 is completely discharged, but the present disclosure is not limited thereto.

If the first time t1 has not elapsed, the controller 220 maintains the charging function (S224). When the first time t1 has elapsed, the controller 220 determines whether the connected mobile terminal 100 supports the CDP scheme (S235). If the mobile terminal 100 supports the CDP scheme, the controller 220 switches the first connection mode to the second connection mode (S236), and if the mobile terminal 100 does not support the CDP scheme, the controller 220 activates the third connection modules and connects the charging device and the mobile terminal 100 according to the SDP scheme (S237).

The controller 220 checks whether there is newly updated data in the second or third connection mode (S239), and if newly updated data exists, the controller 220 performs the backup function for backing up the newly updated data (S239). The controller 220 may execute the backup function for a second time t1 and, here, the second time t1 may be a time during which only a part of data to be backed up is backed up.

When the second time t1 has elapsed (S240), the controller 220 switches the second or third connection mode to the first connection mode. In the first connection mode, the controller 220 interrupts data communication through the DCP scheme and performs the charging function.

Referring to FIG. 7B, when the mode is switched to the first connection mode again, the controller 220 performs the charging function for a reduced first time t1', and performs the backup function for an increased second time t1'. The sum of the first and second times t1 and t2 and the sum of the first and second times t1' and t2' are set to be equal to each other. However, it is preferable that the first time t1 is set to be longer than the second time t1 in order to maintain a stable charging state of the mobile terminal.

That is, while the charging function and the backup function are repeated, the first time for which the charging function is performed is continuously shortened and the second time for which the backup function is performed is continuously increased. Accordingly, the backup function may be performed, while maintaining a stable charging state, according to user's intention toward charging, and as charging of the battery proceeds, more time is spent for the backup function, thereby securing time for backing up a larger amount of data.

The charging function and the backup function are repeatedly performed until charging or data backup is completed. That is, when backup of the data is completed, the controller 220 maintains only the first connection mode, and when the charging is completed, the controller 220 maintains only the second or third connection mode.

Figure 7C:
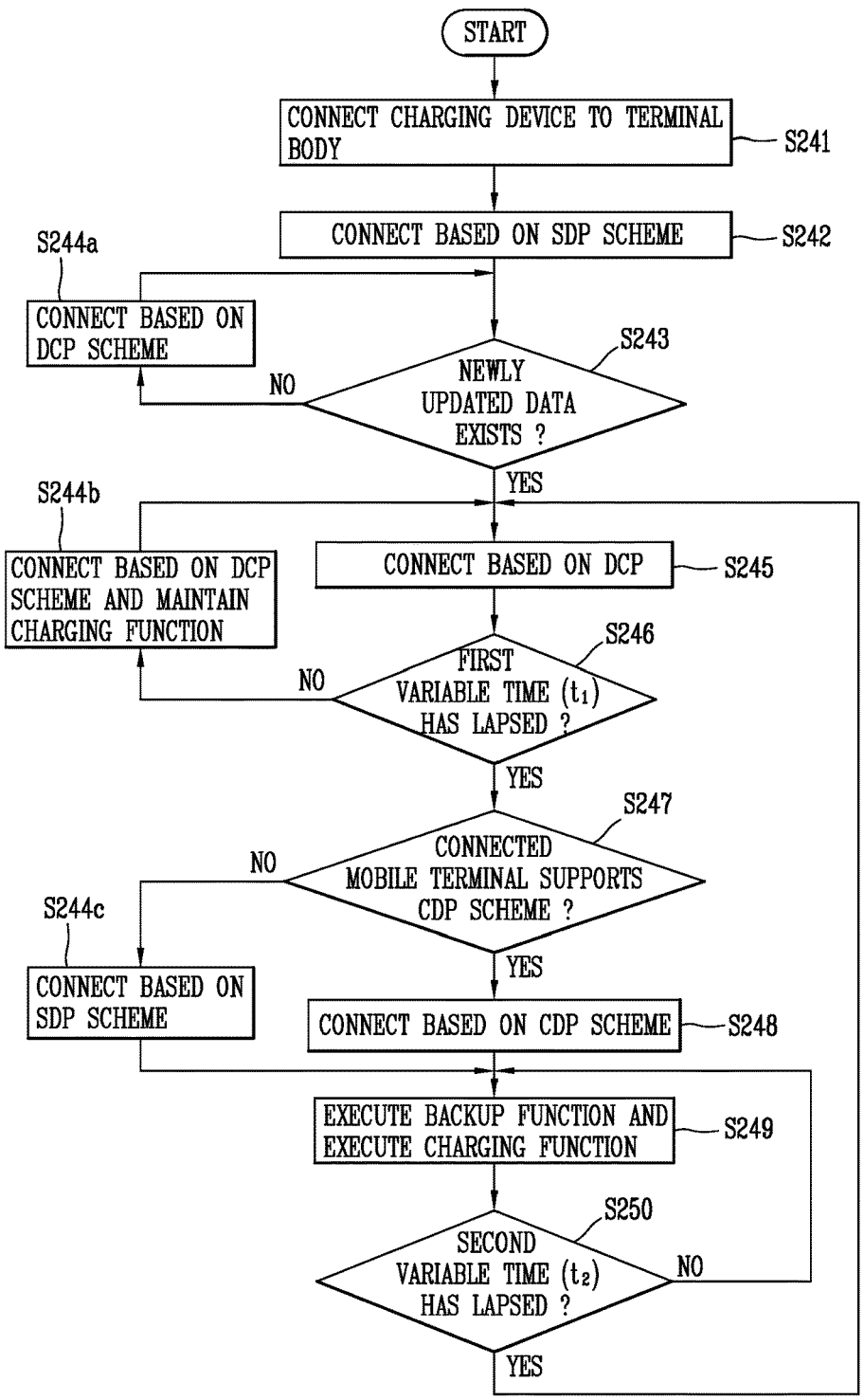
FIG. 7C is a conceptual diagram illustrating a control method of repeatedly performing a backup function and a charging function according to another embodiment.

FIG. 7C is a conceptual diagram illustrating a control method of repeatedly performing the backup function and the charging function according to another embodiment.

Referring to FIG. 7C, when the mobile terminal is connected to the charging device 200 (S241), the controller 220 activates the third connection mode (S242). The controller 220 determines whether there is newly updated data through the SDP scheme (S243).

If there is no newly updated data, the controller 220 switches to the first connection mode to perform the charging function according to the DCP scheme (S244a). If there is newly updated data, the controller activates the first connection mode for a first variable time t1.

The controller 220 performs the charging function according to the DCP scheme for the first variable time t1 (S244b). When the first variable time t1 has elapsed (S246), the controller 220 determines whether the connected mobile terminal 100 supports the CDP scheme (S247).

If the mobile terminal 100 supports the CDP scheme, the controller 220 activates the second connection mode (S248), and if the mobile terminal 100 does not support the CDP scheme, the controller 220 activates the third connection mode (S249). The controller 220 performs the backup function and the charging function according to the CDP scheme or the SDP scheme in the first and second connection modes, respectively (S249).

The controller 220 performs the backup function and the charging function for the second variable time t2 (S250), and when the second variable time t2 has elapsed, the controller 220 switches to the first connection mode again and performs only the charging function.

Here, the first and second variable times t1 and t2 are not fixed but may be changed based on a charged remaining power amount and a backup state of the data. Activation of the first connection mode and the second or third connection mode is repeated until the charging is completed or the backup is completed.

According to this embodiment, since it is possible to select a method of performing the charging function after determining whether the backup function is necessary through the SDP scheme, the data backup function may be performed without missing data each time the user connects the mobile terminal to the charging device 200.

The charging device 200 according to the present embodiments may include the memory 210. The memory 210 stores data received from the mobile terminal 100. The data stored in the memory 210 may be restored to the mobile terminal 100 based on a specific control command.

Figure 8A:
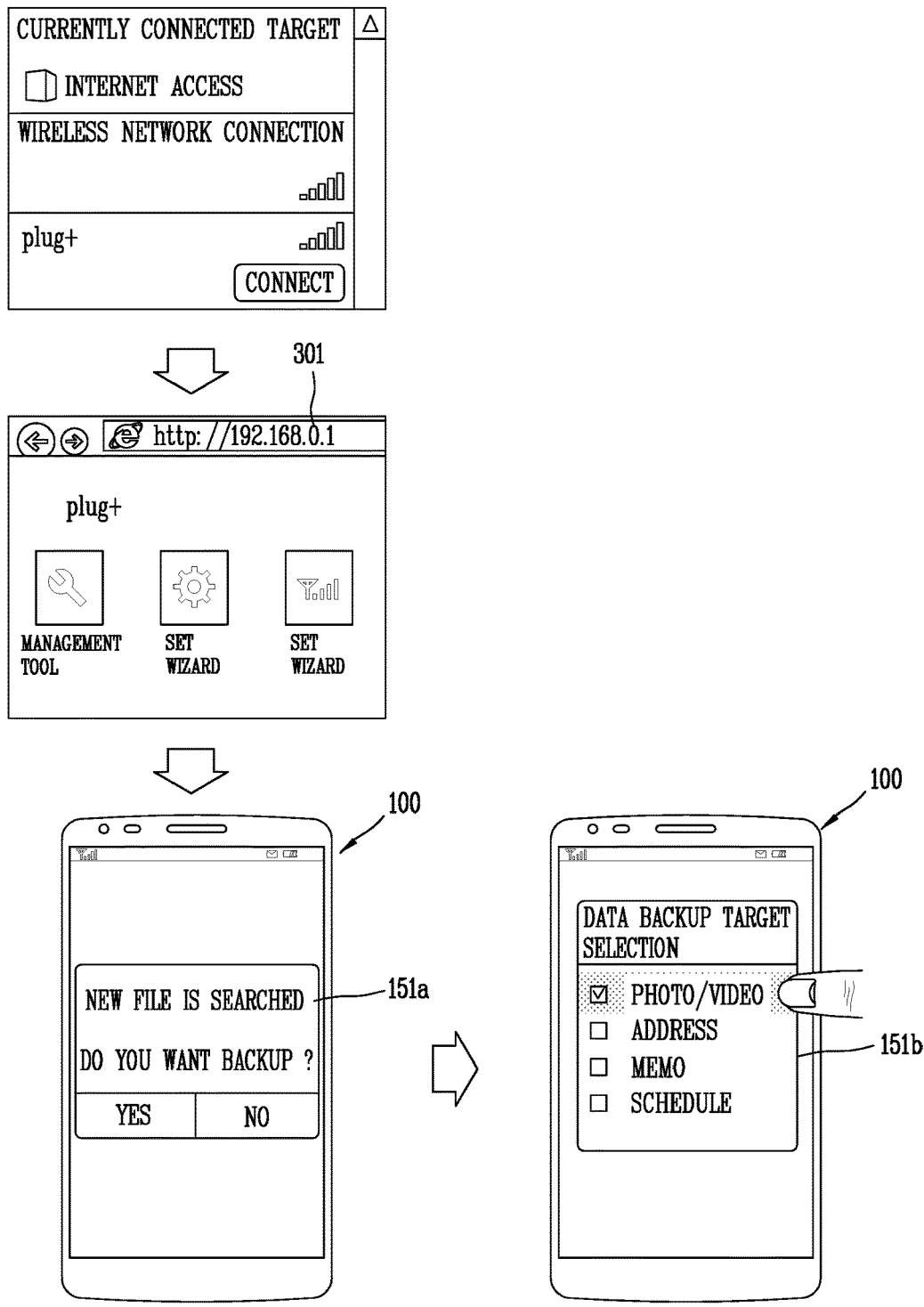
FIG. 8A is a conceptual diagram illustrating a control method for backing up data to a specific server.

FIG. 8A is a conceptual diagram illustrating a control method for backing up data to a specific server.

The charging device 200 according to the present embodiment includes the wireless communication module 280. When the backup function is executed, the controller 220 controls the wireless communication module 280 to perform wireless communication with a preset server. The wireless communication scheme may be implemented by a Wi-Fi scheme.

The controller 220 may set a specific server for storing the backup data based on a setting of the user. As for the setting of the specific server, an address 301 of a specific server may be set on a Web connected by the mobile terminal 100 connected to the charging device or an external device.

When the second or third connection mode is activated, the controller 220 controls the wireless communication module 280 to be connected to the set server. When data is received from the mobile terminal, the wireless communication module 280 transmits the data to the server. The data stored in the specific server may be restored to the mobile terminal 100 without going through the charging device 200. Meanwhile, when a command for receiving the data is received, the mobile terminal 100 may output a notification window 151*a* for notifying about the command.

According to the present embodiment, a separate storage space is not required in the charging device 200, and data may be restored to the mobile terminal without connecting the charging device 200.

When wirelessly connected to the specific server, the mobile terminal 100 may output a backup setting screen 151*b*. The user may select a type of data to be backed up and/or data to be restored by the backup setting screen 151*b*.

FIGS. 8B to 8E are conceptual diagrams illustrating a control method of selecting data to be backed up.

Screen information for the specific server may be output through the mobile terminal 100 connected to the charging device 200 according to the present embodiment. The charging device 200 is controlled to receive data set (selected) through the screen information.

Figure 8B:
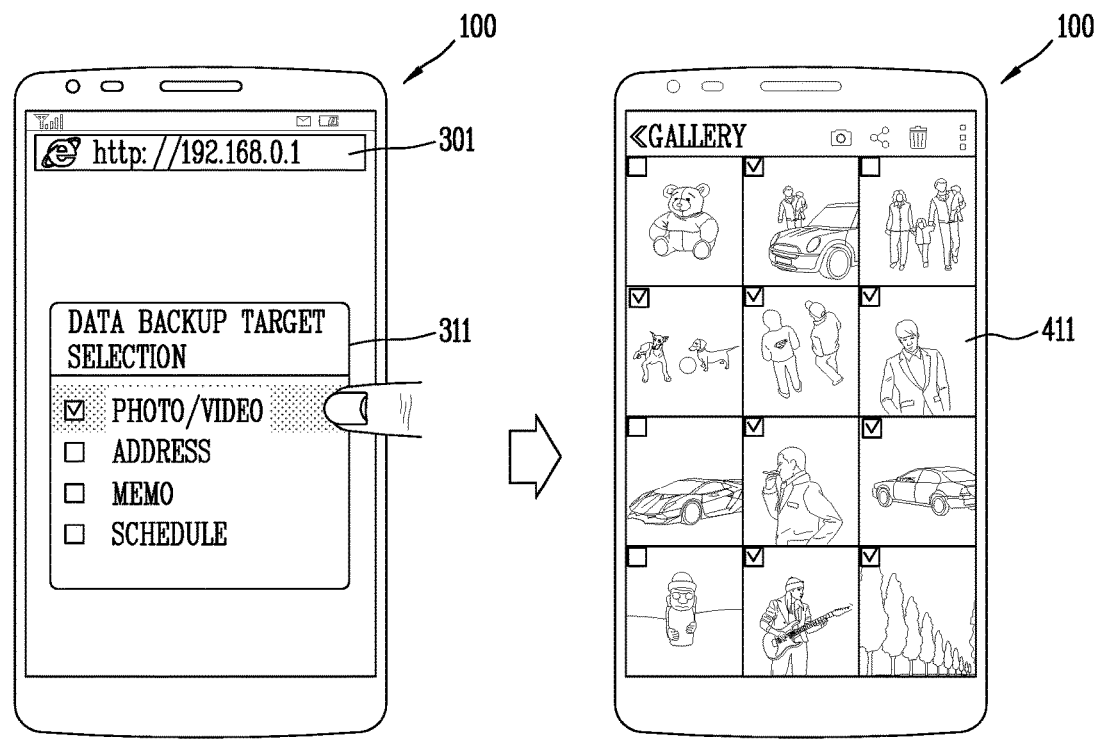
FIGS. 8B to 8E are conceptual diagrams illustrating a control method of selecting data to be backed up.

Referring to FIG. 8B, when the specific server is connected through the mobile terminal 100, the mobile terminal 100 outputs a first setting screen 311. The first setting screen 311 includes a list for selecting a backup target. For example, the list may be sorted by types of data. Here, the types of data may be a photograph, video, an address book, a memo, a schedule, and the like, and the types of the data may be classified according to a type of file and a type of application related to the file.

When one list is selected from the first setting screen 311, the controller 180 of the mobile terminal 100 controls the display unit 151 to output the screen information 411 including data items. The screen information 411 may correspond to an execution screen of a specific application. That is, the controller 180 may execute a specific application by selecting the list.

The controller 180 may apply a touch input to the screen information 411 to individually select data to be backed up. In this case, the charging device 200 receives only the data to be selected from the mobile terminal 100.

Figure 8C:
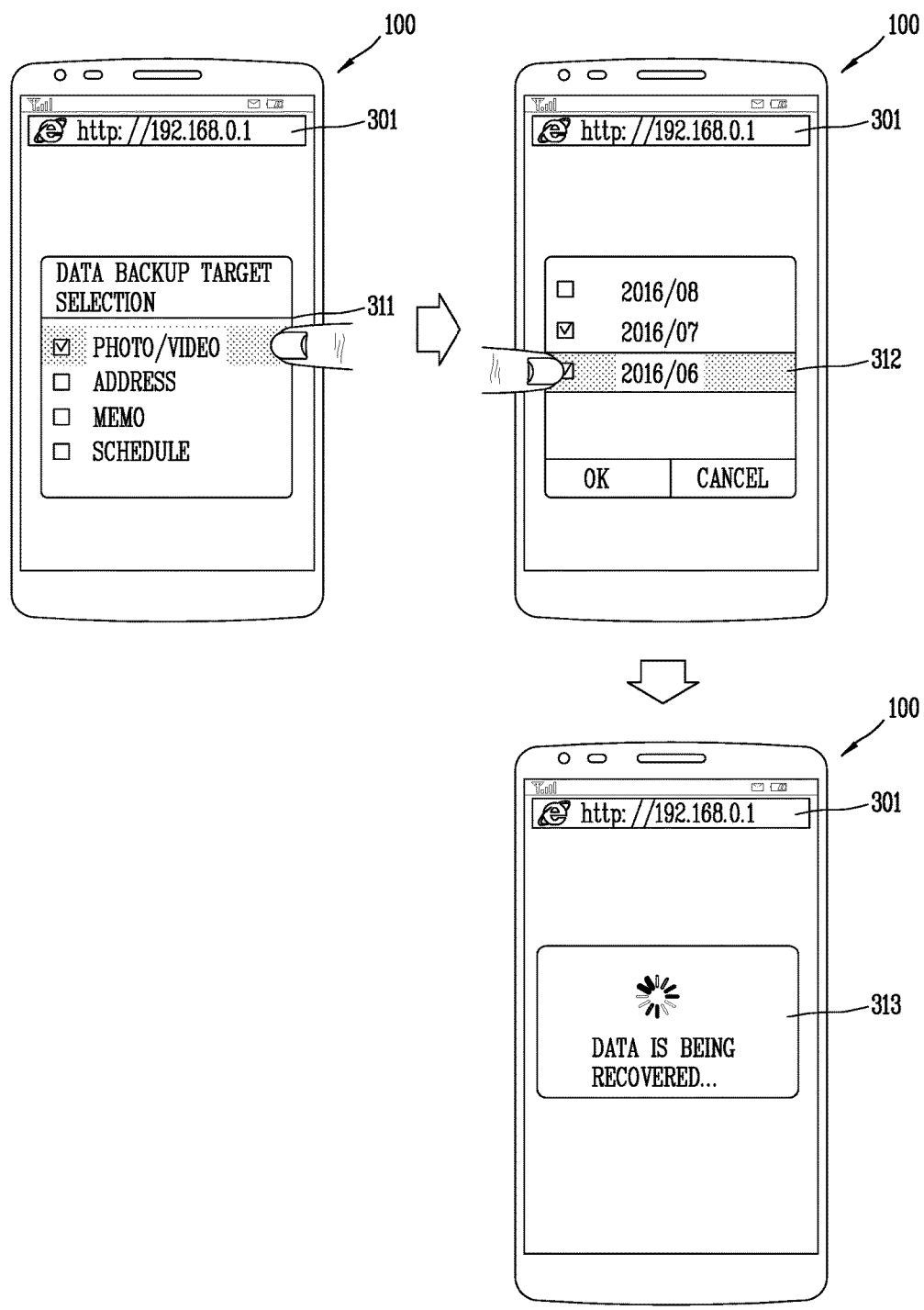

Referring to FIG. 8C, when a specific type of data to be backed up is selected on the first setting screen 311 in a state in which the display unit 151 of the mobile terminal 100 is connected to the specific server 301, a second setting screen 312 for selecting a formation date of the data may be output.

The charging device 200 may receive only the data formed on the date selected by the second setting screen 312 and store the received data in the memory 210. The display unit 151 of the mobile terminal 100 may output an image 313 indicating that backup is in progress.

Figure 8D:
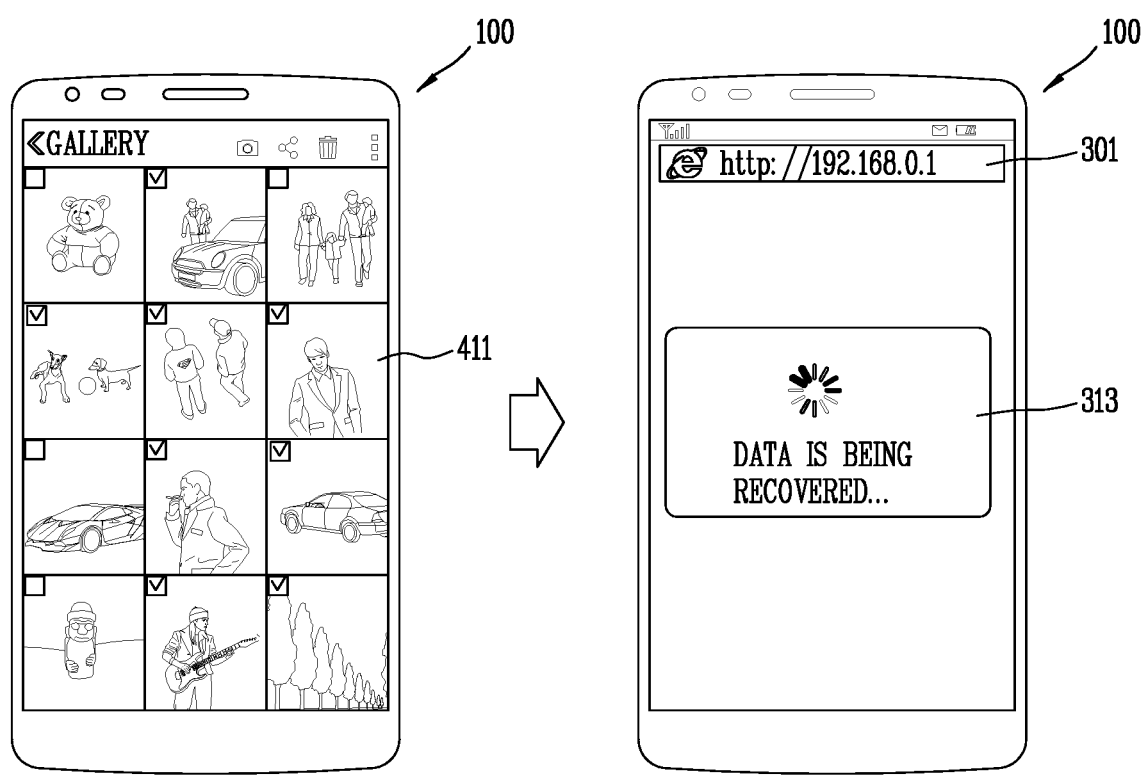

In FIG. 8D, part of data may be selected in a state in which screen information 411 including newly updated data is output. In a state in which a specific application is executed, the controller 180 may select part of data by applying a touch input to the screen information 411.

When the data is selected in a state in which the charging device 200 is connected, the charging device 200 immediately receives the selected data. Or, although the charging device 200 is not connected, the data to be backed up may be selected using the screen information 411. In this case, the charging device 200 may selectively receive only the most recently selected data.

Figure 8E:
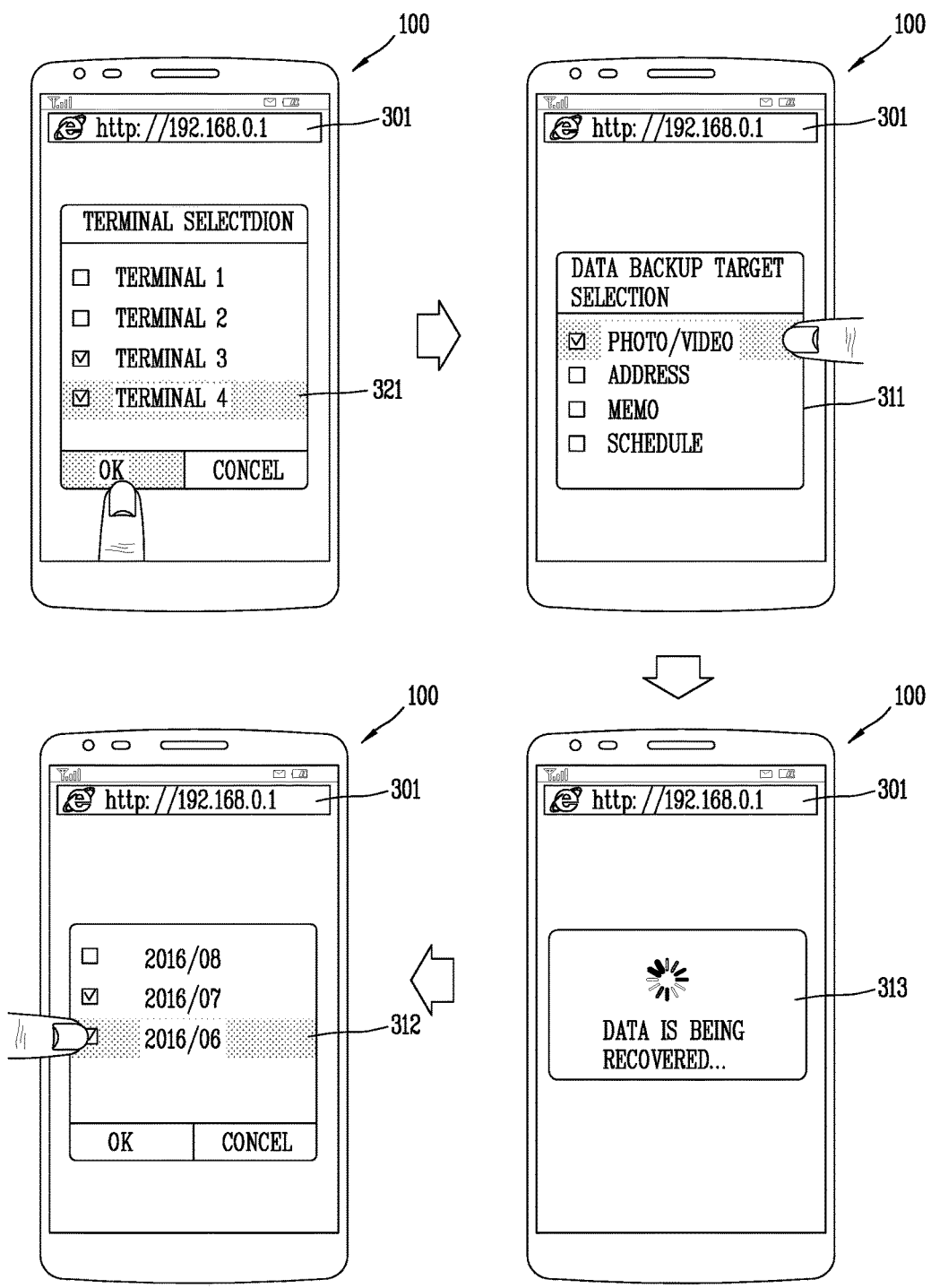

That is, the user may select data to be backed up even in a state in which the mobile terminal is not connected to the charging device 200. Referring to FIG. 8E, in a state in which the mobile terminal 100 is connected to the specific server 301, the display unit 151 of the mobile terminal 100 displays a third setting screen 321 for setting a terminal connected to the charging device 200. The third setting screen 321 may include information regarding terminals which have been connected.

When the mobile terminal 100 is selected as a terminal connected to the charging device 200 (or another terminal connected to the charging device 200 is selected), the controller 180 of the mobile terminal 100 displays the first screen information 311 for selecting data to be backed up.

The charging device 200 may receive backup data selected by the first setting screen 311 or output the second setting screen 312 for selecting a date on which the backup data was formed.

According to the embodiments, a specific server wirelessly connected to the charging device 200 may be connected through the mobile terminal or another external device to select data for backup. Thus, when connected to the charging device 200, the user may select data to be backed up in advance or in real time.

The terminal body 100 to back up data may be previously specified or registered in the charging device 200, in performing the backup function. That is, the charging device 200 may perform the backup function only with the terminal body 100 that has previously been registered. That is, based on the terminal body 100 connected wiredly or wirelessly and authentication information of the connected terminal body 100, only when the connected terminal body 100 is the previously registered terminal body 100, the charging device 200 may perform data backup. Hereinafter, a control method of a backup function according to registration of the mobile terminal 100 will be described.

Figure 9A:
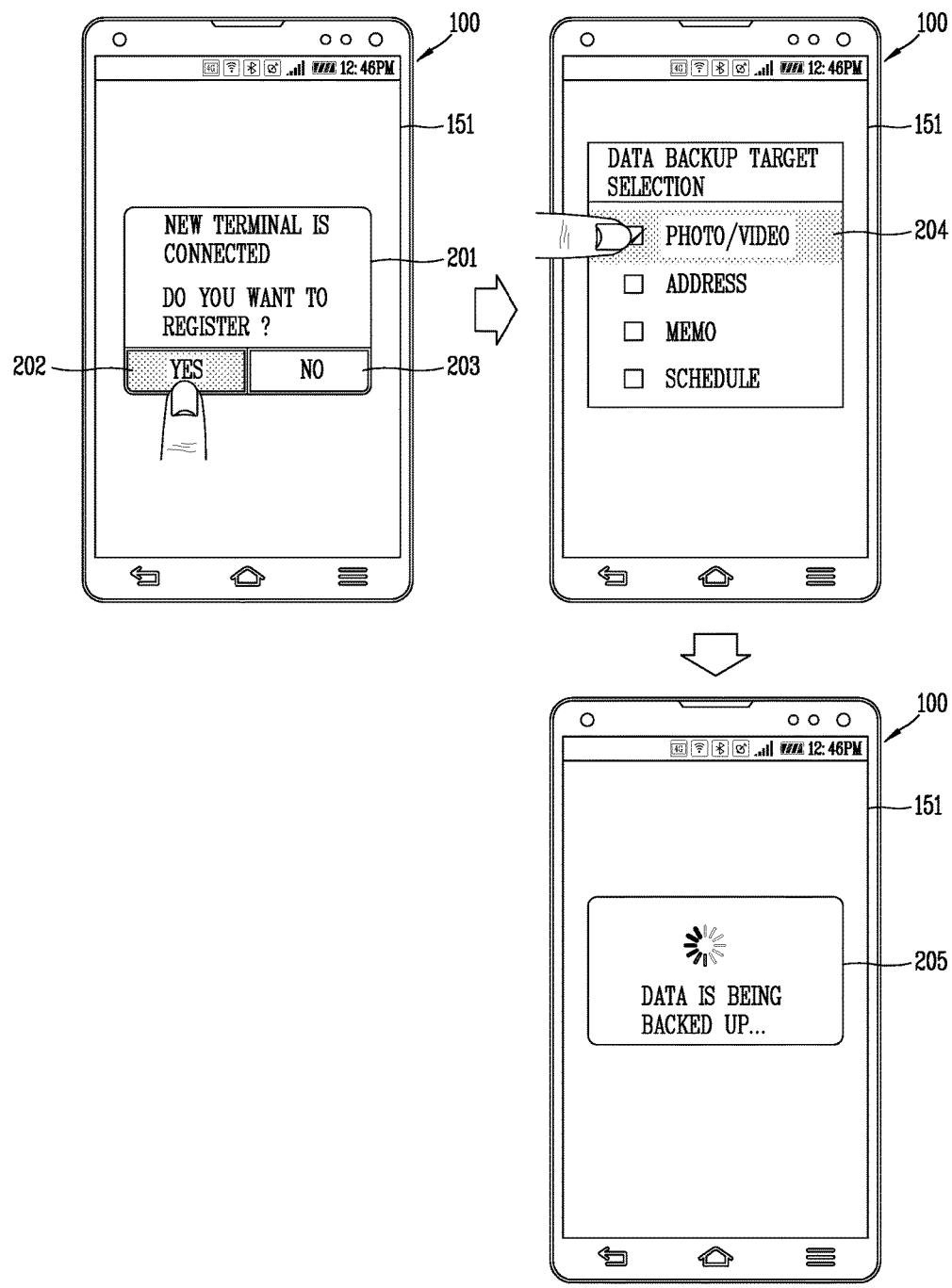
FIG. 9A is a conceptual diagram illustrating a method of performing a data backup function by a mobile terminal according to the present disclosure.
Figure 9B:
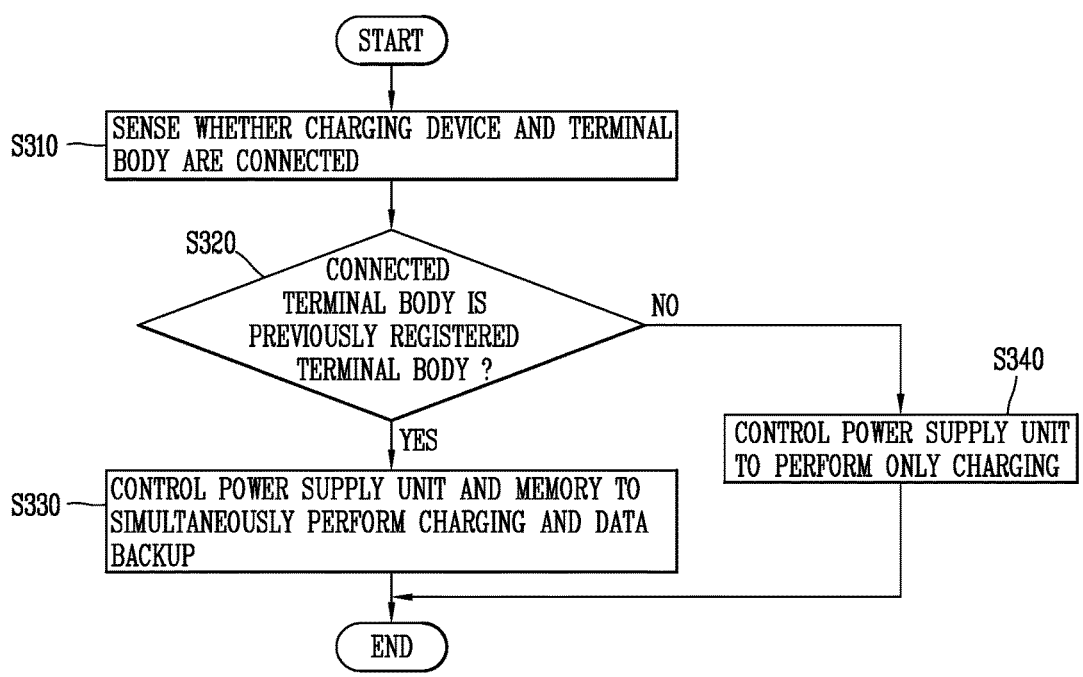
FIG. 9B is a flowchart illustrating a control method regarding data backup of a mobile terminal according to an embodiment of the present disclosure.

FIG. 9A is a conceptual diagram illustrating a method of performing a data backup function by a mobile terminal according to the present disclosure. FIG. 9B is a flowchart illustrating a method for controlling data backup of a mobile terminal according to an embodiment of the present disclosure.

Meanwhile, registration of the terminal body 100 may be performed based on user selection or user request. For example, when the terminal body 100, which has not been registered in the charging device 200, is connected, notification information related to registration of the connected terminal body 100 may be output.

Here, the notification information may be output in various manners. The notification information may be output using at least one of an audible, tactile, and visual methods.

For example, as shown in a first figure of FIG. 9A, a notification window 201 related to registration of the terminal body 100 may be output on the display unit 151 disposed in the terminal body 100. The notification window 201 may include virtual buttons 202 and 203 related to "registering the terminal body 100 in the charging device 200" and "not registering the terminal body 100 in the charging device 200".

Here, when the virtual button 202 related to "registering the terminal body 100 in the charging device 200' is touched, the currently connected terminal body 100 is registered in the charging device 200.

Specifically, although the registered terminal body 100 is disconnected from the charging device 200 and re-connected to the charging device 200, the controller 220 of the charging device 200 may recognize that the previously connected terminal body 100 is connected. In this case, the process of registering the terminal body 100 illustrated in the first figure of FIG. 2B may be omitted.

When the virtual button 203 related to "not registering the terminal body 100 in the charging device 200" is touched, the currently connected terminal body 100 is not registered in the charging device 200. In this case, the controller 220 of the charging device 200 may perform only the function of supplying power to the connected terminal body 100, without performing the data backup function.

If user selection related to "not registering the terminal body 100 in the charging device 200" is input at least once, the charging device 200 may not output the notification information related to registration of the terminal body 100 although the terminal body 100 is connected to the charging device 200 thereafter. In this case, the charging device 200 may serve to only supply power to the connected terminal body 100 without outputting the notification information.

Alternatively, although user selection related to "not registering the terminal body 100 in the charging device 200" is input, the charging device 200 related to the present disclosure may output the notification information related to registration of the terminal body 100 each time the terminal body 100 is connected to the charging device 200 thereafter.

In the present disclosure, as described above, when the previously registered terminal body 100 is connected to the charging device 200, data stored in the terminal body 100 is transferred to the charging device 200 and the transmitted data may be stored in the charging device 200. That is, the entirety or a portion of the data stored in the terminal body 100 may be stored in the charging device 200.

Meanwhile, in the present disclosure, data, among data stored in the terminal body 100, to be stored in the charging device 200 may be determined based on user selection, or may be determined under the control of the controller 220.

The controller 220 may be one of the controller 180 of the terminal body 100 and the controller 220 of the charging device 200.

The controller 220 may determine data, among data stored in the memory 170 of the terminal body 100, to be backed up may be determined based on a type (or format) of data, an application associated with data, a generation date of data, a storage date of data, a change (or correction) date of data, whether data has been previously stored in the charging device 200, and the like.

Further, as an example, referring to FIG. 9A, the data to be stored in the charging device 200 may be set based on a user selection.

In this case, when it is sensed that the terminal body 100 has been previously registered by the charging device 200, the controller 220 outputs a graphic object 204 related to a type of data on the display unit (or the touch screen 151). The controller 220 may set the type of data to be stored in the charging device 200 based on a touch input applied to the graphic object 204. This will be described in detail later.

Referring to the third figure of FIG. 9A, when the setting of data to be stored in the charging device 200 is completed, data is transmitted between the charging device 200 and the terminal body 100.

Here, information indicating that backup is in progress may be output on the display unit 151. In the figure, the information is output in the form of a notification window 205 at the center of the screen of the display unit 151, but the present disclosure is not limited thereto. That is, the information may also be output in the form of an icon at a status bar output on the display unit 151.

Hereinafter, a method of performing the data backup function after the terminal body 100 is registered based on the above description will be described in more detail.

Figure 10A:
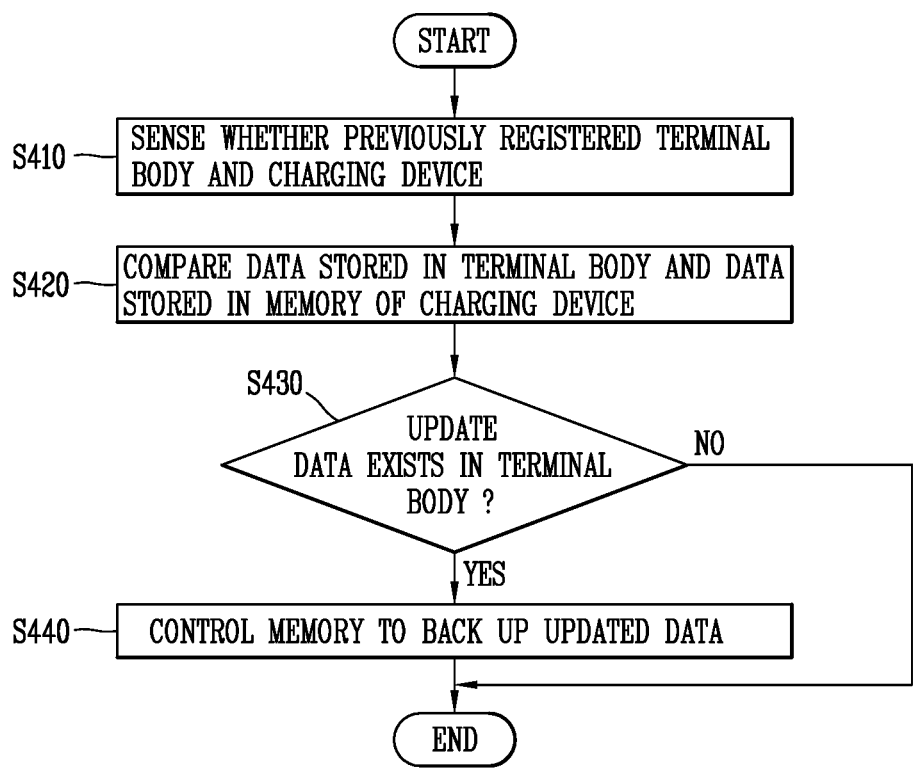
FIG. 10A is a flowchart illustrating a control method regarding data backup when a previously registered terminal body is connected to a charging device.
Figure 10B:
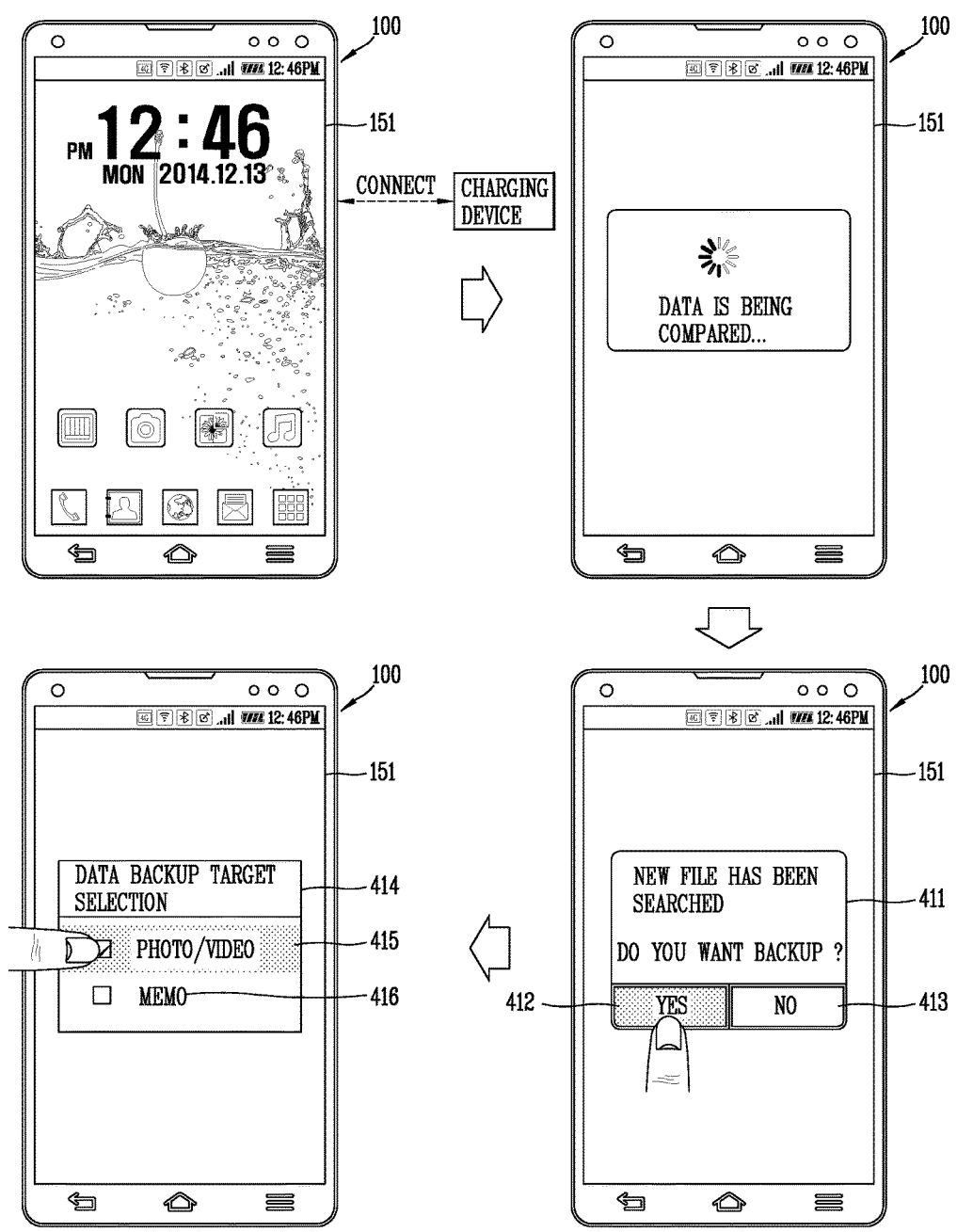
FIGS. 10B to 10D are conceptual diagrams illustrating the control method of FIG. 10A.

Referring to FIG. 10B, in the mobile terminal according to the present disclosure, it is detected whether the charging device 200 is connected to the terminal body 100 (S310). Here, the charging device 200 may be connected to the terminal body 100 wiredly or wirelessly as described above.

When the charging device 200 is connected to the terminal body 100 wiredly, the charging device may be connected to the terminal body 10 through the interface unit 160 provided in the terminal body 100.

When the charging device 200 is connected to the terminal body 100 wirelessly, the charging device 200 may be connected to the terminal body 100 through the wireless communication unit 110 provided in the terminal body 100 and the wireless communication unit 280.

In an example, the terminal body 100 may be connected to the charging device 200 through the interface unit 160 wiredly. Specifically, the terminal body 100 may be connected to the charging device 200 through a USB universal serial bus on-the-go (OTG) method.

In this case, a communication terminal of the charging device 200 may be connected to an external charging device 200 port of the terminal body 100, the wired data port, the memory card port, and a portion connecting a device having an identification module.

When it is sensed that the terminal body 100 is connected as described above, the controller 220 of the charging device 200 determines whether the connected terminal body 100 is the registered terminal body 100 (S320).

In detail, when it is sensed that the terminal body 100 is connected, the charging device 200 receives authentication information of the terminal body 100 from the terminal body 100. As described above, the authentication information (or the identification information) of the terminal body 100 is unique information of the connected terminal body 100 and may be information for the charging device 200 to identify the terminal body 100 to which the charging device 200 is connected. The authentication information may include at least one of product identification (PID) information, service set identifier (SSID) information, connection security scheme information, and a password.

When the charging device 200 is connected to the terminal body 100, the authentication information may be received from the terminal body 100 although there is no user request.

The controller 220 of the charging device 200 compares the received authentication information with authentication information stored in the memory 210. When the received authentication information matches one of pieces of authentication information stored in the memory 210, the controller 220 of the charging device 200 determines that the terminal body 100 connected to the charging device 200 is a previously registered terminal body 100.

When it is determined that the connected terminal body 100 is the previously registered terminal body 100, the controller 220 performs the charging function and the data backup function simultaneously (S330). That is, the charging device 200 supplies power to the connected terminal body 100 and stores at least a portion of the data stored in the terminal body 100, in the memory 210 of the charging device 200. In other words, the controller 220 controls the charging unit 230 and the memory 210 to simultaneously perform charging and data backup.

When it is determined that the connected terminal body 100 is not the registered terminal body 100, the controller 220 performs only the charging function (S340). In other words, the controller 220 controls the charging unit 230 only to perform charging and does not control the memory 210. That is, the execution of the backup function of the data stored in the terminal body 100 may be restricted.

In other words, when product identification (PID) information (or service set identifier (SSID) information, connection security method information, and a password) of the terminal body 100 included in authentication information received from the connected terminal body 100 corresponds to PID information of the previously registered terminal body 100, the controller 220 of the charging device 200 performs the backup function, and when the PID information (or SSID information, connection security method information and a password) of the terminal body 100 does not correspond to the PID information of the previously registered terminal body 100, the controller 220 may restrict execution of the backup function.

As described above, according to the present disclosure, the data backup function is executed only when the terminal body 100 connected to the charging device 200 is the previously registered terminal body 100. That is, the charging device 200 related to the present disclosure may determine whether the connected terminal body 100 has been set to "terminal body 100 requiring data backup" by the user by using authentication information of the terminal body 100.

Accordingly, the charging device 200 may perform the charging function and the data backup function on the previously registered terminal body 100 which has been authenticated. Therefore, the user may conveniently manage data of the terminal body 100 without using a separate memory device or a web-based backup service.

According to the present disclosure, whenever the charging device 200 and the terminal body 100 are connected to charge the terminal body 100, the data of the terminal body 100 may be backed up to the charging device 200. That is, in case where the terminal body 100 is the previously registered terminal body 100, when the terminal body 100 and the charging device 200 are connected, the data from the terminal body 100 may be automatically copied to the memory 210 of the charging device 200, even without a user request or input regarding backup. Therefore, although the user does not spent time for data backup or cares about data backup, data may be systematically managed.

Meanwhile, in the present disclosure, when the terminal body 100, which has been undergoes data backup at least once, is connected to the charging device 200, only an updated portion of data of the terminal body 100 may be copied to the charging device 200 may be copied. This will be described in detail with reference to the accompanying drawings hereinafter.

Figure 10C:
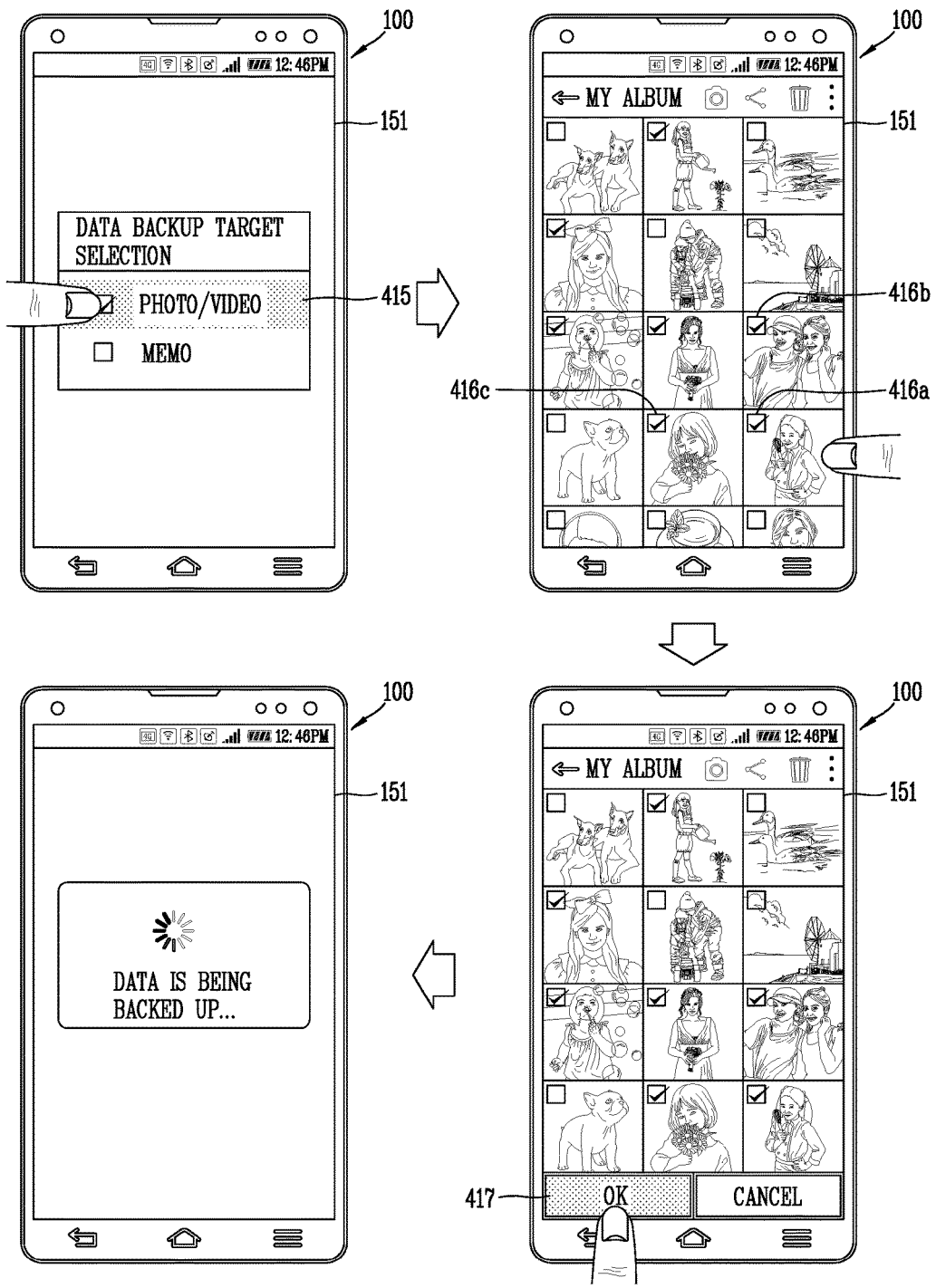
Figure 10D:
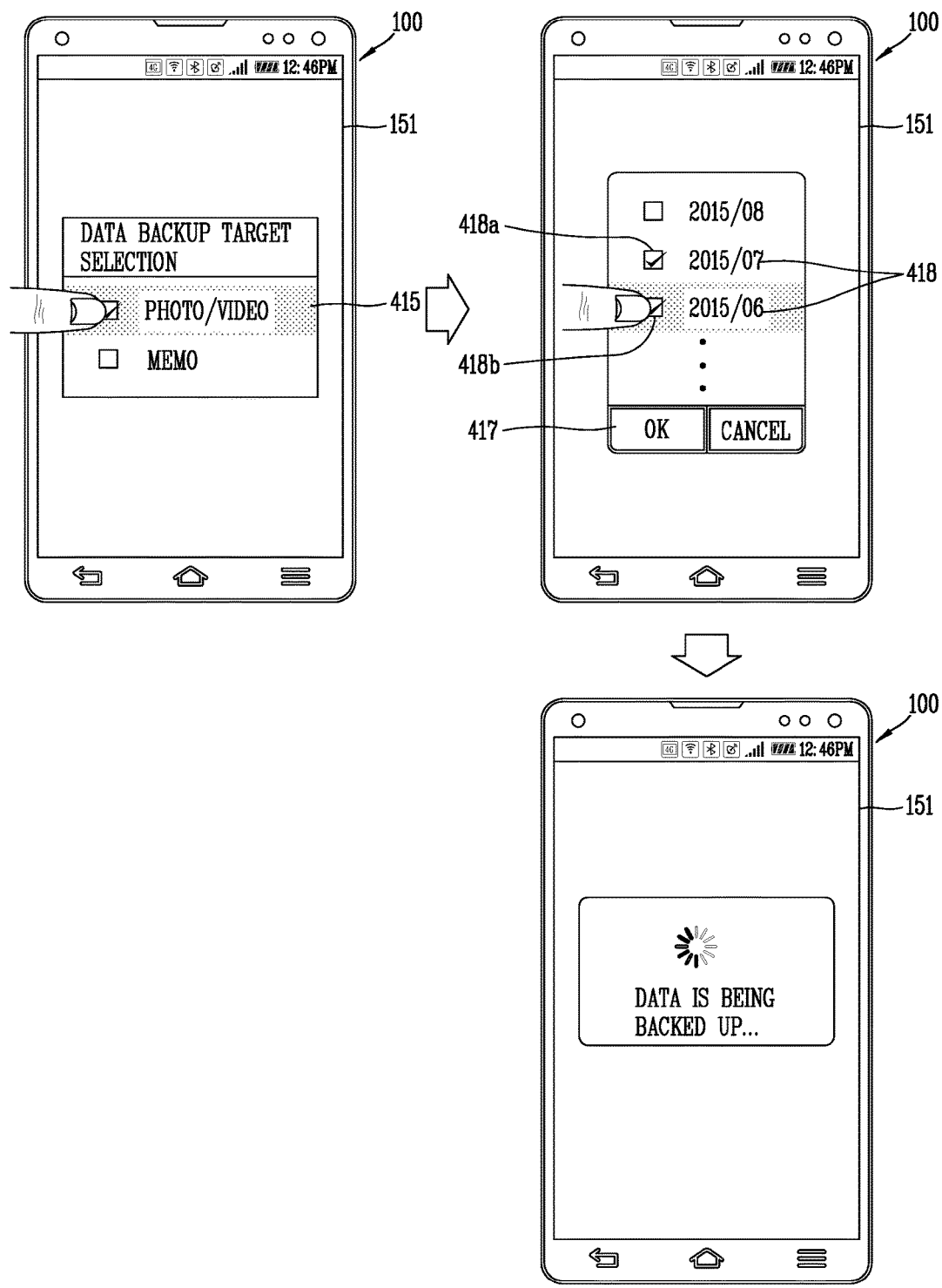

FIG. 10A is a flowchart illustrating a method of controlling data backup performed when the previously registered terminal body 100 is connected to the charging device 200, and FIGS. 10B to 10D are conceptual diagrams illustrating the control method of FIG. 10A.

Referring to FIG. 10A, the controller 220 of the charging device 200 detects whether the charging device 200 is connected to the terminal body 100 (S410).

As described above, when the charging device 200 is connected to the terminal body 100, the charging device 200 receives authentication information of the connected terminal body 100. When the received authentication information matches one of pieces of authentication information stored in the memory 210 of the charging device 200, the controller 220 of the charging device 200 determines the connected terminal body 100 as a previously registered terminal body 100.

When it is sensed that the previously registered terminal body 100 and the charging device 200 are connected, the controller compares data stored in the terminal body 100 with data stored in the memory 210 of the charging device 200 (S420).

Here, the controller may refer to the controller 220 of the charging device 200 and/or the controller 180 of the terminal body 100.

In case where the controller 220 is the controller 220 of the charging device 200, information of the data stored in the previously registered terminal body 100 may be transmitted to the charging device 200, and the controller 220 of the charging device 200 may compare the information of the transmitted data with the information of the data stored in the memory 210 of the charging device 200.

Alternatively, in case where the controller 220 is the controller 180 of the terminal body 100, information of the data stored in the memory 210 of the charging device 200 may be transmitted to the terminal body 100 and the controller 180 of the terminal 100 may compare the information of the transmitted data with the information of the data stored in the terminal body 100.

In detail, when data backup from the terminal body 100 is completed or while backup of the data stored in the terminal body 100 is proceeding, the controller may generate a log file regarding data transmitted to (or stored in) the charging device 200.

That is, when backup of the data stored in the terminal body 100 is performed again, the controller may compare the data stored in the terminal body 100 and data stored in the memory 210 of the charging device 200 using the log file.

The controller may determine whether there is updated data in the terminal body 100 through the above-described comparison step (S430).

Specifically, the controller 220 compares the information stored in the log file with the information stored in the terminal body 100, and determines information, which is not stored in the log file, among data stored in the terminal body 100, as updated data.

When there is no updated data, the charging device 200 related to the present disclosure may perform only the charging function, without performing the data backup function. For example, when the information stored in the log file matches the information stored in the terminal body 100, data transmission may not occur between the charging device 200 and the terminal body 100.

In case where data is not stored in the terminal body 100 but stored in the log file due to deletion of the data by the user, transmission of data may not occur between the charging device 200 and the terminal body 100. That is, the data stored in the memory 210 of the charging device 200 may be more than the data stored in the terminal body 100. In this case, data transmission may not occur between the charging device 200 and the terminal body 100 until a user request for data restoration is input.

When there is updated data, the controller 220 may control the memory 210 of the charging device 200 to back up the updated data (S440). That is, the backup may be performed on different data using the information stored in the log file. When the backup of the different data is completed, the controller 220 may update the log information to include a log of data that has been backed up to a specific point in time.

If the updated data exists in the terminal body 100 according to a result of the comparison, the controller according to the present disclosure may output notification information indicating that the updated data exists.

The notification information may be output in various manners. That is, the notification information may be output using at least one of audible, tactile, and visual methods.

For example, referring to FIG. 10B (specifically, referring to a third drawing of FIG. 10B), when there is updated data, a notification window 411 indicating the existence of the data is output on the display unit 151.

The notification window 411 may include virtual buttons 412 and 413 associated with 'proceeding with backup of updated data' and 'not proceeding with backup of updated data', respectively.

That is, in the present disclosure, when there is updated data in the terminal body 100, the data may be transmitted from the terminal body 100 to the charging device 200 according to user selection.

For example, when the virtual button 412 related to 'proceeding with backup of updated data' is touched by the user, the controller 220 may perform backup of the updated data.

Also, when the virtual button 413 related to 'not proceeding with backup of updated data' is touched by the user, the controller 220 may not perform the backup of the updated data.

That is, according to the present disclosure, although the charging device 200 and the terminal body 100 are connected, the data backup function is not unconditionally activated but activated after a permission command for data backup is received from the user.

However, the present disclosure is not limited thereto, and it is also possible to activate the data backup function is directly activated without outputting the notification information when updated data exists. In this case, the controller 220 may transmit and store the updated data in the terminal body 100 to the charging device 200 although there is no request from the user.

Also, in the present disclosure, when the virtual button 412 related to 'proceeding with backup of updated data' is touched, information 414 about a data type of the updated data may be output on the display unit 151. That is, the information 414 may include text or graphic objects 415 and 416 for each data type. In this case, when a touch applied to any one 415 of the text or graphic objects is detected, backup may be performed only on the updated data belonging to the data type corresponding to the touch-sensed text or graphic object 415.

Referring to FIG. 10B, for example, the types of data may be divided into a photo/video, a document (or a memo), an address, a schedule, an application, and the like. If the updated data exists only in the photo/movie or document (or memo), text or graphic objects 415 and 416 corresponding to the photo/movie, document (or memo) may be output.

Here, when a touch input applied to the text or graphic object 415 corresponding to the photo/video is detected, only data belonging to the photo/video, among the updated data, may be backed up.

Accordingly, the user may check a type of the updated data in the terminal body 100, and may back up only data belonging to some kind of the updated data.

Furthermore, the controller 220 according to the present disclosure may perform a backup function only for a part of data based on a user selection, among the data belonging to the same kind. This will be described in more detail with reference to FIGS. 10C and 10D.

In the mobile terminal according to the present disclosure, it is possible to provide a user interface by which the user may more intuitively select data to be backed up.

For example, referring to first and second drawings of FIG. 10O, when a touch input applied to text or graphic object 415 corresponding to 'photo/video' is sensed, graphic objects corresponding to data belonging to the 'photo/video', among the updated data, are output on the display unit 151. When a preset type of touch is applied to the output graphic objects, the touched graphic objects 416 may be selected. Also, indicators 416a, 416b, and 416c indicating selection of the graphic objects may be output in an overlapping manner. The indicators 416a, 416b, and 416c may be output near the graphic objects 416.

Referring to third and fourth drawings of FIG. 10O, a virtual button 417 corresponding to confirming the selection of the graphic objects may be activated on the display unit 151. That is, when a touch is applied to the virtual button 417 in a state in which at least some of the graphic objects are selected, the controller 220 may control backup of data corresponding to the selected graphic objects.

Meanwhile, as described above, in the present disclosure, the backup function may be performed only a part of data belonging to the same kind based on a user selection. Here, the part of data may be selected based on a date of storage or a date of creation of the data. In this case, a graphic object named 'a period in which data is stored (or a created period)' may be output on the display unit 151.

For example, referring to the first and second drawings of FIG. 10D, when a touch input is applied to text or a graphic object 415 corresponding to 'photo/video', updated data belonging to the 'photo/video' is sorted based on the date of storage or date of creation. The controller 220 outputs graphic objects corresponding to the updated data sorted on the basis of the storage date or creation date on the display unit 151.

When a preset type of touch is applied to at least some of the graphic objects, the touched graphic objects 418 may be selected. Also, indicators 418a and 418b indicating that the selected graphic objects 418 have been selected may be output in an overlapping manner. The indicators 418a and 418b may be output near the graphic objects 418.

Referring to the second drawing of FIG. 10D, the virtual button 417 corresponding to completion of the selection of the graphic objects may be activated on the display unit 151. That is, when a touch is applied to the virtual button 417 in a state in which at least some of the graphic objects are selected, the controller 220 may start controlling backup of data corresponding to the selected graphic objects.

That is, referring to FIG. 10D, after a touch is applied to the graphic objects named '2015/07' and '2015/06' is touched, when the virtual button 417 is touched, the controller 220 may perform the backup function on data stored or generated in the terminal body 100 in June and July, 2015.

Meanwhile, according to the present disclosure, a plurality of terminal bodies 100 may be registered in the single charging device 200. In this case, data backed up from each terminal body 100 is separately managed in the memory 210 of the charging device 200. In other words, when the preset terminal body 100 is in plurality, the controller 220 may control the memory 210 to separately store data backed up from each terminal body 100. Therefore, the single charging device 200 may perform the backup function of data stored in the plurality of terminal bodies 100.

Meanwhile, the data stored in the memory 210 of the charging device 200 may be duplicated to the terminal body 100 connected to the charging device 200. This will be described in detail with reference to FIGS. 5A and 5B.

Figure 11A:
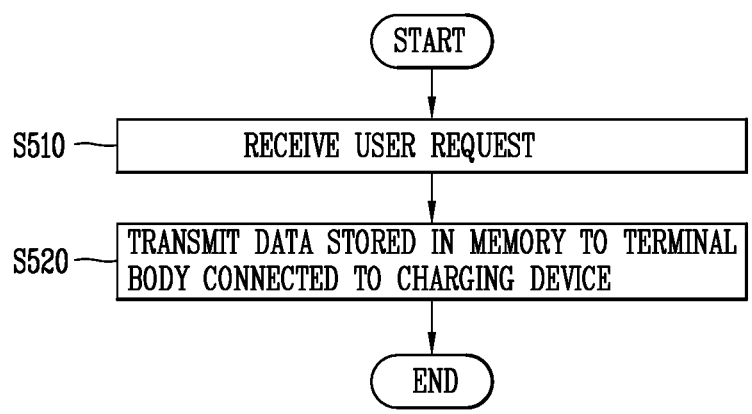
FIG. 11A is a flowchart of a control method related to data recovery.
Figure 11B:
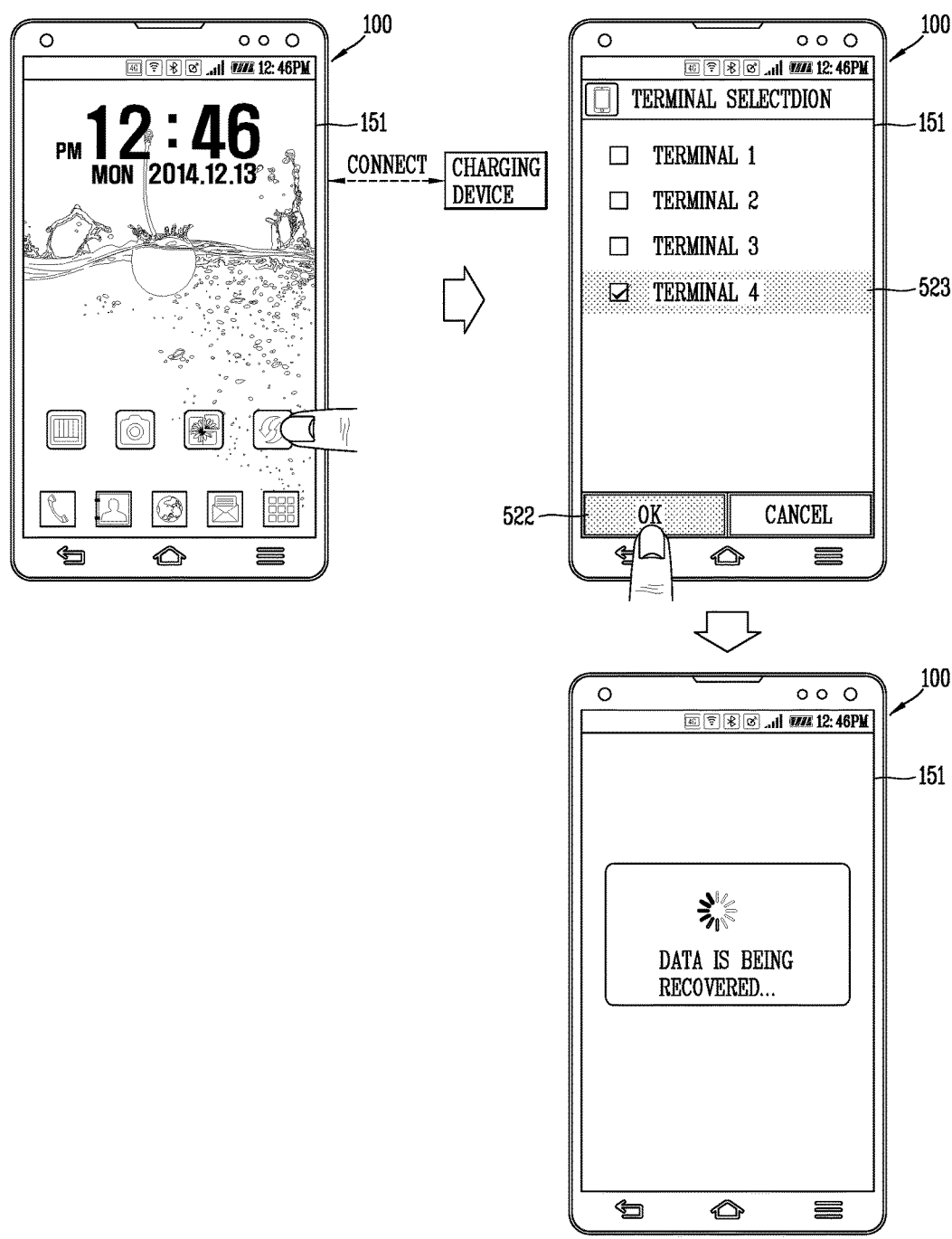
FIG. 11B is a conceptual diagram illustrating the control method of FIG. 11A.

FIG. 11A is a flowchart of a control method related to data recovery, and FIG. 11B is a conceptual diagram illustrating the control method of FIG. 11A.

Referring to FIG. 11A, when a user request related to data recovery is input (S510), data stored in the memory 210 of the charging device 200 is transmitted to the terminal body 100 connected to the charging device 200 (S520). Here, the data may be transmitted wiredly or wirelessly according to a connection state of the charging device 200 and the terminal body 100.

The user request related to recovery of the data may be input to the mobile terminal in various manners. For example, when a separate switch is formed in the charging device 200, the user request may be input through an ON/OFF operation of the switch.

For example, the function related to data recovery may be performed through a backup function related application installed in the terminal body 100.

The backup function related application may be downloaded from an external server via wireless communication. Alternatively, the application may be present in the terminal body 100 from the time when the mobile terminal was released.

For example, referring to the first and second drawings of FIG. 11B, after the charging device 200 and the terminal body 100 are connected, when the application is executed by the user, an application execution screen 521 related to data recovery may be output.

The execution screen 521 may include a virtual button 522 associated with data recovery. When the touch for the virtual button 522 is input, the controller 220 may transmit and/or duplicate data stored in the memory 210 of the charging device 200 to the terminal body 100 connected to the charging device 200.

Meanwhile, as described above, the terminal body 100 registered in the charging device 200 may be plural. In this case, when a user request for data recovery is input, the controller 220 may transmit data backed up from any one of the previously registered terminal bodies 100, among the data stored in the memory 210, to the terminal body 100 currently connected to the charging device 200.

Here, whether to recover the data backed up from the terminal body 100 to the currently connected terminal body 100 may be determined based on a user selection.

For example, referring to the second drawing of FIG. 11B, text or graphic objects corresponding to the plurality of previously registered terminal bodies 100 may be output on an execution screen of an application output to the display unit 151. Here, when some of the graphic objects are selected by a touch input applied by the user and the virtual button related to starting of data recovery, the controller 220 may recover data backed up from the previously registered terminal bodies corresponding to the selected graphic object 523 to the currently connected terminal body 100.

That is, referring to the second and third drawings of FIG. 11B, when a touch is applied to the graphic object 523 named 'Terminal 4' and then a touch is applied to the graphic object 522 named 'OK', data, which has been transmitted from the terminal body 100 corresponding to the graphic object and stored in the memory 210, starts to be transmitted to the currently connected terminal body 100.

Accordingly, when the user changes the terminal body 100, the user may store the data, stored in the previous terminal body 100, in the new terminal body 100 through the charging device 200 again.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

INDUSTRIAL APPLICABILITY

The present disclosure provides the charging device for backing up data stored in a mobile terminal, while supplying power. Therefore, the present invention may be utilized in various related industrial fields.

The invention claimed is:
1. A charging device comprising:
a body connectable to a mobile terminal;
a charging unit charging the mobile terminal in a first connection mode;
a backup unit performing a backup function upon receiving data stored in the mobile terminal in a second connection mode in which data communication is available; and
a controller determining whether there is new data which has been updated in the second connection mode, and switching the first connection mode to the second connection mode on the basis of whether the new data is stored in the mobile terminal in a state in which the charging device is connected to the mobile terminal, wherein, when the new data exists, the controller receives data from the mobile terminal in the switched second connection mode, while charging the mobile terminal,
wherein data communication is interrupted in the first connection mode, and a charging rate in the first connection mode is higher than a charging rate in the second connection mode.

2. The charging device of claim 1, wherein when it is impossible for the mobile terminal to be connected in the second connection mode, the controller switches to a third connection mode, and
wherein the first connection mode corresponds to a dedicated charging port (DCP), the second connection mode corresponds to a charging downstream port (CDP), and the third connection mode corresponds to a standard downstream port (SDP).

3. The charging device of claim 2, wherein when the mobile terminal is connected, the controller connects the mobile terminal in the second connection mode or the third connection mode, and when receiving data is completed, the controller switches to the first connection mode.

4. The charging device of claim 3, wherein the controller switches to the second connection mode upon checking whether the second connection mode is available.

5. The charging device of claim 2, wherein the controller executes the charging function in the first connection mode for a first time and switches the first connection mode to the second connection mode or the third connection mode to perform the backup function for a second time, and
wherein the first connection mode and the second connection mode or the third connection mode are alternately activated until when there is no more data to be received or when the mobile terminal reaches a fully charged state.

6. The charging device of claim 5, wherein after the mobile terminal is connected, the controller gradually decreases the first time and gradually increases the second time.

7. The charging device of claim 2, further comprising a lighting unit provided in the body and emitting light,
wherein the lighting unit includes a first emission region outputting light in the first connection mode and a second emission region outputting light in the second connection mode or the third connection mode.

8. The charging device of claim 7, further comprising a memory storing data received from the mobile terminal,
wherein the lighting unit outputs light to indicate a remaining capacity regarding a storage space of the memory.

9. The charging device of claim 8, further comprising an audio output unit outputting voice information indicating a remaining capacity of the memory.

10. The charging device of claim 7, wherein the controller controls the lighting unit to output light in different colors to indicate whether the backup function and/or the charging function is performed.

11. The charging device of claim 1, wherein when connection to the mobile terminal is sensed, the controller activates the first connection mode for a specific time to execute a charging function, and
wherein after the lapse of the specific time, the controller detects whether there is data to be received from the mobile terminal.

12. The charging device of claim 11, wherein the specific time is set to time taken for a battery of the mobile terminal to be switched to a fully charged state.

13. The charging device of claim 1, further comprising a wireless communication module performing wireless communication with a preset server,
wherein the controller controls the wireless communication module to transmit data received from the mobile terminal to the preset server.

14. The charging device of claim 13, wherein the controller receives only data selected through the specific server among data stored in the mobile terminal.

15. The charging device of claim 1, further comprising a memory storing data received from the mobile terminal.

16. The charging device of claim 1, further comprising a memory storing data received from the terminal body by the backup function,
wherein when a terminal body of the mobile terminal is connected, the controller controls the backup unit to perform the backup function on the basis of whether the connected terminal body is a previously registered terminal body.

17. The charging device of claim 16, wherein when the connected terminal body is a previously registered terminal body, the controller determines whether there is the new data in the terminal body by comparing data stored in the terminal body and data stored in the memory.

18. The charging device of claim 1, further comprising:
a receptacle formed to be depressed on the body; and
a socket received in the receptacle and protruding outwards by an eternal force,
wherein when the socket is connected to an external device, the controller transmits the data to the external device.

19. The charging device of claim 1, wherein, when the new data does not exist, the controller switches the second connection mode to the first connection mode, and data communication is interrupted while charging the mobile terminal in the first connection mode.

* * * * *